(12) United States Patent
Yamamoto et al.

(10) Patent No.: US 7,791,995 B2
(45) Date of Patent: Sep. 7, 2010

(54) IMAGE INFORMATION DETECTING APPARATUS

(75) Inventors: Tsuyoshi Yamamoto, Gunma (JP); Katsuhiko Masuda, Gunma (JP); Shigefumi Morishima, Gunma (JP); Toru Tanaka, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 717 days.

(21) Appl. No.: 11/668,984

(22) Filed: Jan. 30, 2007

(65) Prior Publication Data

US 2007/0256088 A1    Nov. 1, 2007

(30) Foreign Application Priority Data

Jan. 31, 2006    (JP)    .............................. 2006-022731

(51) Int. Cl.
    *G11B 7/00*    (2006.01)
(52) U.S. Cl. .................................. 369/47.27
(58) Field of Classification Search ............. 369/44.26, 369/44.41, 44.34, 53.22, 124.1, 124.12, 47.27, 369/53.1, 47.1, 47.19, 47.2, 53.31
    See application file for complete search history.

(56) References Cited

U.S. PATENT DOCUMENTS

| 6,577,566 | B1 * | 6/2003 | Tomita | 369/44.26 |
| 6,925,041 | B2 * | 8/2005 | Kai et al. | 369/47.51 |
| 7,436,420 | B2 * | 10/2008 | Honda et al. | 347/224 |
| 7,558,169 | B2 * | 7/2009 | Morishima | 369/44.35 |
| 2005/0265158 | A1 * | 12/2005 | Minamimoto et al. | 369/47.1 |
| 2007/0230923 | A1 | 10/2007 | Takahashi et al. | |

FOREIGN PATENT DOCUMENTS

| JP | 2001202626 A | 7/2001 |
| JP | JP2002203321 A | 7/2002 |
| JP | 2004-5847 | 1/2004 |
| JP | 2004213796 A | 7/2004 |
| JP | 2006139863 A | 6/2006 |
| WO | WO2005122156 A1 | 12/2005 |

OTHER PUBLICATIONS

Chinese Office Action for Application No. 200710007400.5 dated Nov. 20, 2009 (with English translation), 7 pages.
Japanese Patent Office Action dated Jan. 19, 2010 for Application No. 2006-022731, 5 pages.
Japanese Office Action for Application No. 2006-022731 mailed Apr. 20, 2010 (w/English translation), 4 pages.

* cited by examiner

*Primary Examiner*—Nabil Z Hindi
(74) *Attorney, Agent, or Firm*—Fish & Richardson P.C.

(57) ABSTRACT

An image information detecting apparatus is disclosed that comprises: a semiconductor laser that emits a laser light beam; a light receiving unit that receives a reflected light beam of the laser light beam applied to a color changing layer of an optical disc, the color changing layer being formed from a photo-sensitive material of a heat-sensitive material, and that outputs an electrical signal corresponding to the level of the reflected light beam; and a detecting unit that detects image information based on the electric signal, wherein the image information detecting apparatus detects the image information indicating an image from the color changing layer after the image has been formed therein.

7 Claims, 8 Drawing Sheets

IMAGE INFORMATION DETECTING APPARATUS

CROSS-REFERENCE TO RELATED APPLICATIONS

This application claims the benefit of priority to Japanese Patent Application No. 2006-22731, filed Jan. 31, 2006, of which full contents are incorporated herein by reference.

BACKGROUND OF THE INVENTION

1. Technical Field

The present invention relates to an image information detecting apparatus.

2. Description of the Related Art

At present, optical discs (for example, a CD (Compact Disc), a DVD (Digital Versatile Disc), etc.) are prevailing as recording media for recording/reproducing of information. Recently, an optical disc is additionally proposed that has a color changing layer (a photo-sensitive layer, a heat-sensitive layer, etc.) that changes the color thereof with the light intensity or heat of a laser light beam and can form characters, figures, images, etc., (hereinafter, "images"). Referring to FIG. 8, an example of the structure of an optical disc 100 that can form images is described. The optical disk 100 is structured by laminating a protecting layer 101, a color changing layer 102, and a reflecting layer 103. The color changing layer 102 consists of a photo-sensitive material or a heat-sensitive material that changes (for example, from transparent to colored, etc.) the visible properties thereof (color (color tone, brightness, chroma), reflectance, transmittance, optical obfuscation, etc.) with the light intensity or heat of a laser light beam.

An optical disc apparatus (hereinafter, "optical disc image forming apparatus") is present that applies a laser light beam based on data in a bit map format from, for example, a host computer, etc., to form an image on the color changing layer 102. More specifically, the optical disk image forming apparatus converts the data from, for example, the host computer into image data indicating information of the light-dark state (for example, being dark indicates being colored and being light indicated being colorless) of each dot constituting the image corresponding to the shape of the optical disk 100. Based on the image data, the optical disc image forming apparatus applies a laser light beam at a level with which an image can be formed and a laser light beam at a level with which no image can be formed. A typical optical disc image forming apparatus can be an optical disc image forming apparatus formed by adding an image forming function to an optical disc apparatus that records/reproduces information to/from a recording layer (not shown) of the optical disc formed with grooves and lands thereon. Therefore, the optical disc image forming apparatus can execute various types of servo control incorporated in the optical disc apparatus. The optical disc image forming apparatus executes servo control such as, for example, focus control to focus the laser light beam on the color changing layer 102 in the optical axis direction of the laser light beam (hereinafter, "focusing direction"), thread control to apply the laser light beam in the radial direction of the optical disc 100 (hereinafter, "tracking direction") from the inner circumference side to the outer circumference side, and spindle control to rotate the optical disc 100 synchronizing the application of the laser light beam. When an image forming is executed to the optical disc 100, the tracking control may generally become unstable being attributed to: the difference in position between the recording layer and the color changing layer 102 in the focusing direction; the light absorption of the color changing layer 102; and so forth. Therefore, the tracking control is stopped. The optical disc image forming apparatus thereafter executes application of the laser light beam and the servo control based on the data from the host computer, etc., as above. Thereby, the image indicated by the data can be formed in the color changing layer 102 of the optical disc 100. In an optical disc image forming apparatus shown in, e.g., Patent Document 1, image forming is executed forming a laser light beam at a predetermined vibration frequency in the tracking direction to make the selectivity of the contrast of the image more excellent. As above, an optical disc image forming apparatus that can form an image in the color changing layer 102 based on data from a host computer, etc., has been proposed recently.

A typical conventional optical disc image forming apparatus as above can be an apparatus disclosed in, for example, Japanese Patent Application Laid-Open Publication No. 2004-5847.

However, in a conventional optical disc image forming apparatus as above, it is difficult to detect information indicating the image (hereinafter, "image information") from the color changing layer 102 after the image has been formed therein. Therefore, the image information cannot be detected from the color changing layer 102 after the image has been formed therein. Thereby, various problems may arise. For example, when an image is formed in the color changing layer 102 in the state where data to form the image is not stored in a host computer, etc., or a storage apparatus of an optical disc image forming apparatus, an identical image may not be able to be formed on another optical disc. Otherwise, when an identical image is formed in another optical disc image forming apparatus, an identical image may not be able to be formed if data to form the image cannot be obtained (for example, a recording medium recorded with the data to form the image, or data communication, etc.). Otherwise, in the case of deleting of or overwriting on the image formed on the color changing layer 102, an attempt to reproduce the image after the deleting or overwriting might not have been successful without detecting the image information to be stored in advance in a storage apparatus. Otherwise, forming of the image may be stopped because the optical disc image forming apparatus has received some influence (for example, an impact, shutdown of power supply, etc.) during the forming of image to the color changing layer 102. In this case, to form the image again from the dot at the time of stopping, the optical disc image forming apparatus must detect data to form the image on dots after the dot from the data from the host computer, etc. However, because the image information cannot be detected from the color changing layer 102 in which the image has been formed, the optical disc image forming apparatus may not detect the data to form the image onto the dots after the dot at the time of the stopping. Therefore, excellent image forming may not be executed.

SUMMARY OF THE INVENTION

The aspect of the present invention to solve the above problems provides an image information detecting apparatus comprising: a semiconductor laser that emits a laser light beam; a light receiving unit that receives a reflected light beam of the laser light beam applied to a color changing layer of an optical disc, the color changing layer being formed from a photo-sensitive material or a heat-sensitive material, and that outputs an electric signal corresponding to the level of the reflected light area; and a detecting unit that detects image information based on the electric signal, wherein the image information detecting apparatus detects the image information indicating an image from the color changing layer after the image has been formed therein.

According to the present invention, the image information indicating the image can be detected from the color changing layer of the optical disc after the image has been formed. Other features of the present invention will be more clear referring to the accompanying drawings and the description herein.

BRIEF DESCRIPTION OF THE DRAWINGS

For more complete understanding of the present invention and advantages thereof, refer to the following description together with the accompanying drawings in which.

DETAILED DESCRIPTION OF THE INVENTION

From the description in the specification and the accompanying drawings, at least the following items are disclosed.

<<Configuration of Optical Disc 2>>

Figure 3:
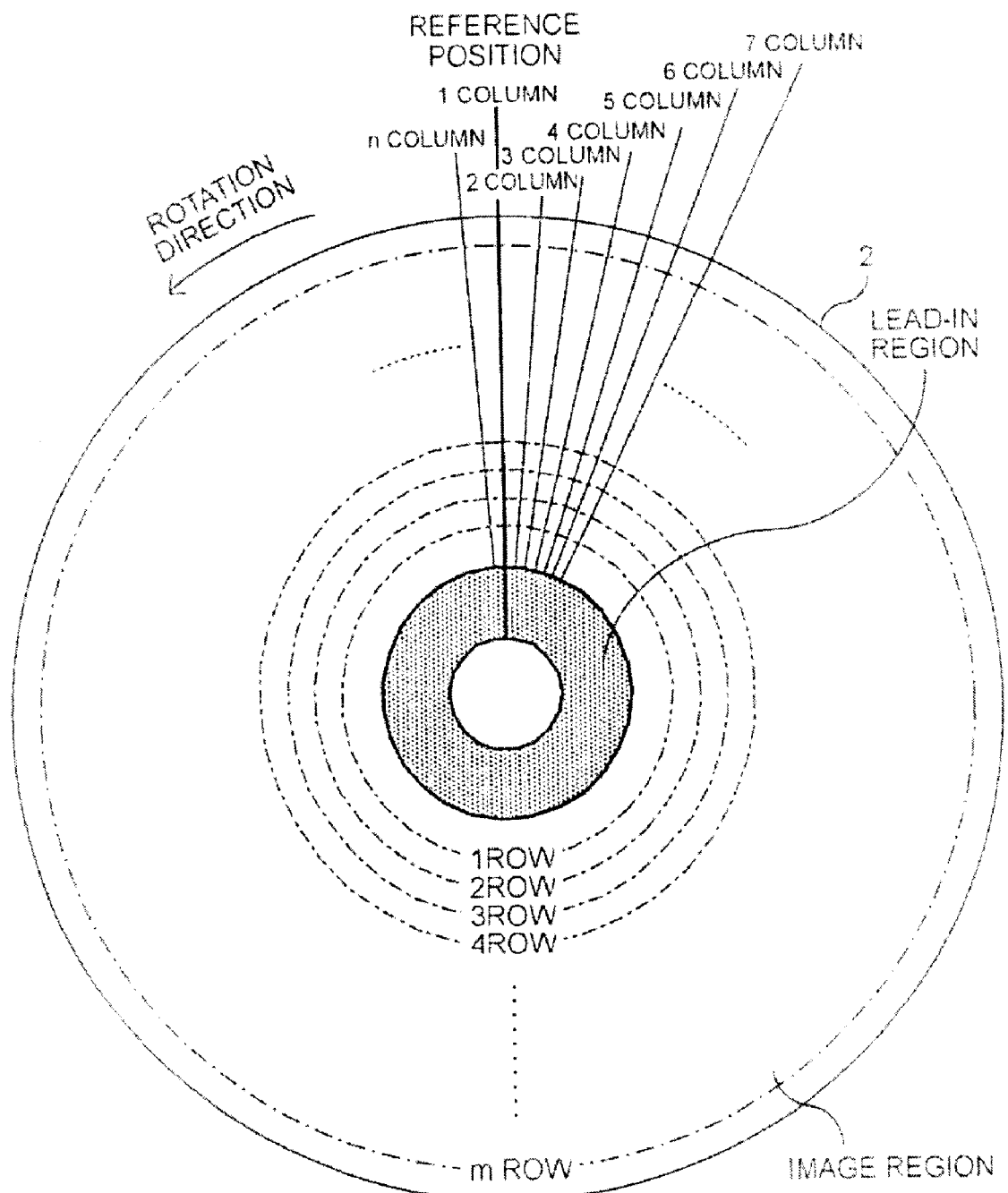
FIG. 3 is a front view of an optical disc.
Figure 8:
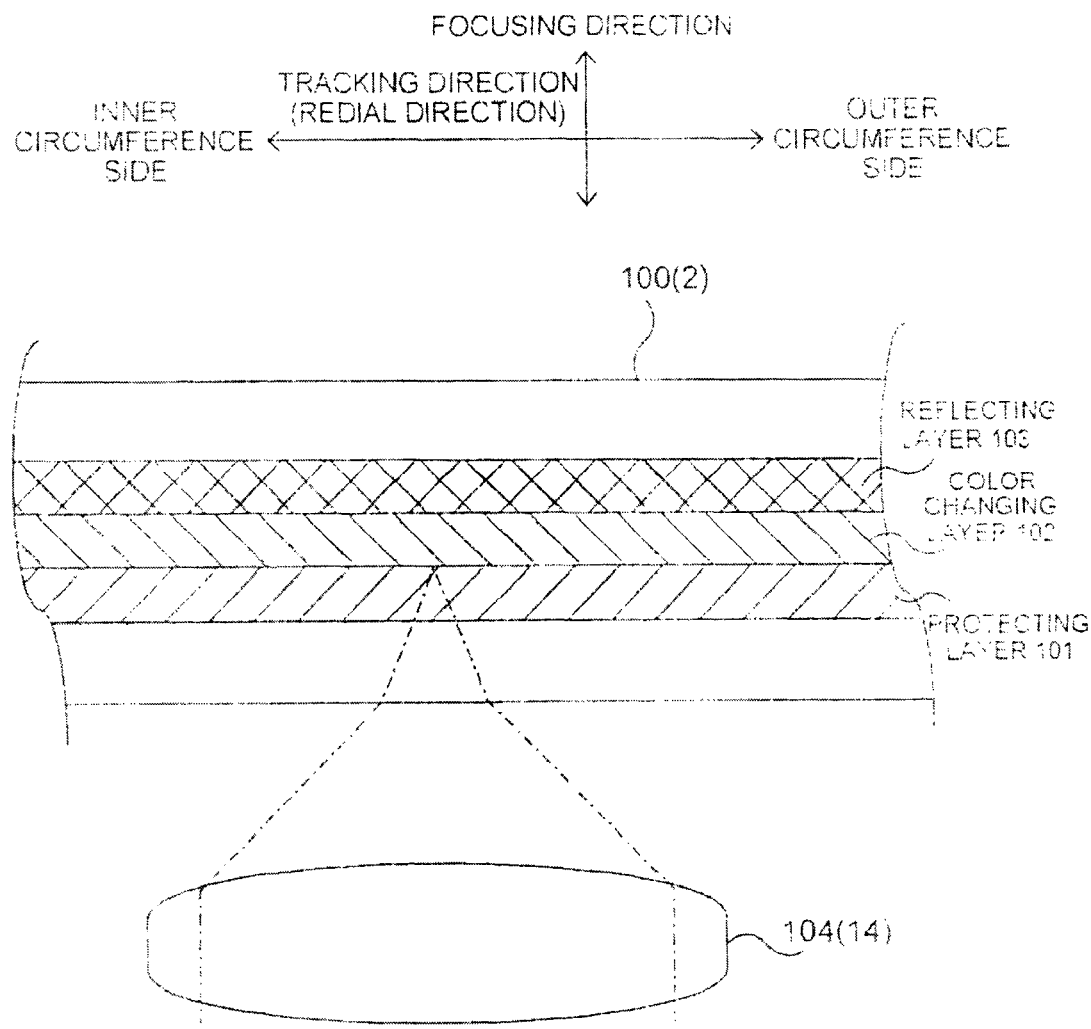
FIG. 8 shows an example of the structure of an optical disc on which an image can be formed.

Referring to FIG. 8 when necessary, description will be given for the structure of an optical disc 2 that is a detection target of an image information by an image information detecting apparatus 1 according to the present invention referring to FIG. 3. FIG. 3 is a front view of the optical disc 2 viewed from the impinging side of a laser light beam applied to the optical disc 2.

The optical disc 2 has a lead-in region that has been in advance recorded with, for example, the standard for the optical disc 2, information on the manufacturer, etc. of the optical disc 2, information on the rotation speed applied to the optical disc 2, information on the optical intensity of the laser light beam, ATIP (Absolute Time in Pre-groove) information, etc., (hereinafter "ATIP information, etc.") in addition to reference position information indicating one reference position in the radial direction of the optical disc 2. The reference position information may be recorded in a recording method for a lead-in region of an ordinary optical disc or, for example, a pit may be formed such that the reflectance against a laser light beam of the pit at a reference position is increased. The reference position information (and ATIP information, etc., of the optical disc 2) may be recorded in a lead-out region (not shown) of the optical disc 2. The optical disc 2 has an image region structured by laminating the protecting layer 101, a color changing layer 102 formed of a photo-sensitive material or a heat-sensitive material, and a reflecting layer 103 shown in FIG. 8. Into the image region of the optical disc 2, a laser light beam from the image information detecting apparatus 1 is applied sequentially, for example, from a dot (divided area) in a first row in a first column on the inner circumference side to a dot in the first row in a second column, . . . , a dot in the first row in a "n"th column, a dot in a second row in a first column, . . . , a dot in the "m"th row in the "n"th column and, thereby, an image is formed. The description will be given assuming that the color changing layer 102 of the optical disc 2 in the embodiment has a characteristic that the reflectance thereof is increased as the laser light beam is applied more. That is, it is assumed that, on dots formed with an image, the reflectance of the dots applied with the laser light beam twice is higher than the reflectance of dots applied with the laser light beam once. The description will be given assuming that, in the embodiment, the optical disc 2 is a medium that supports, for example, the CD standard. The optical disc 2, however, is not limited to a medium supporting the CD standard. The optical disc 2 may be, e.g., a medium supporting the DVD standard. FIG. 3 shows nothing but a view for explaining the arrangement of dots for the sake of convenience, the dots constituting the image formed in the color changing layer 102 of the optical disc 2, while the actual dots are arranged more densely.

<<Example of Overall Configuration of Image Information Detecting Apparatus 1>>

Figure 1:
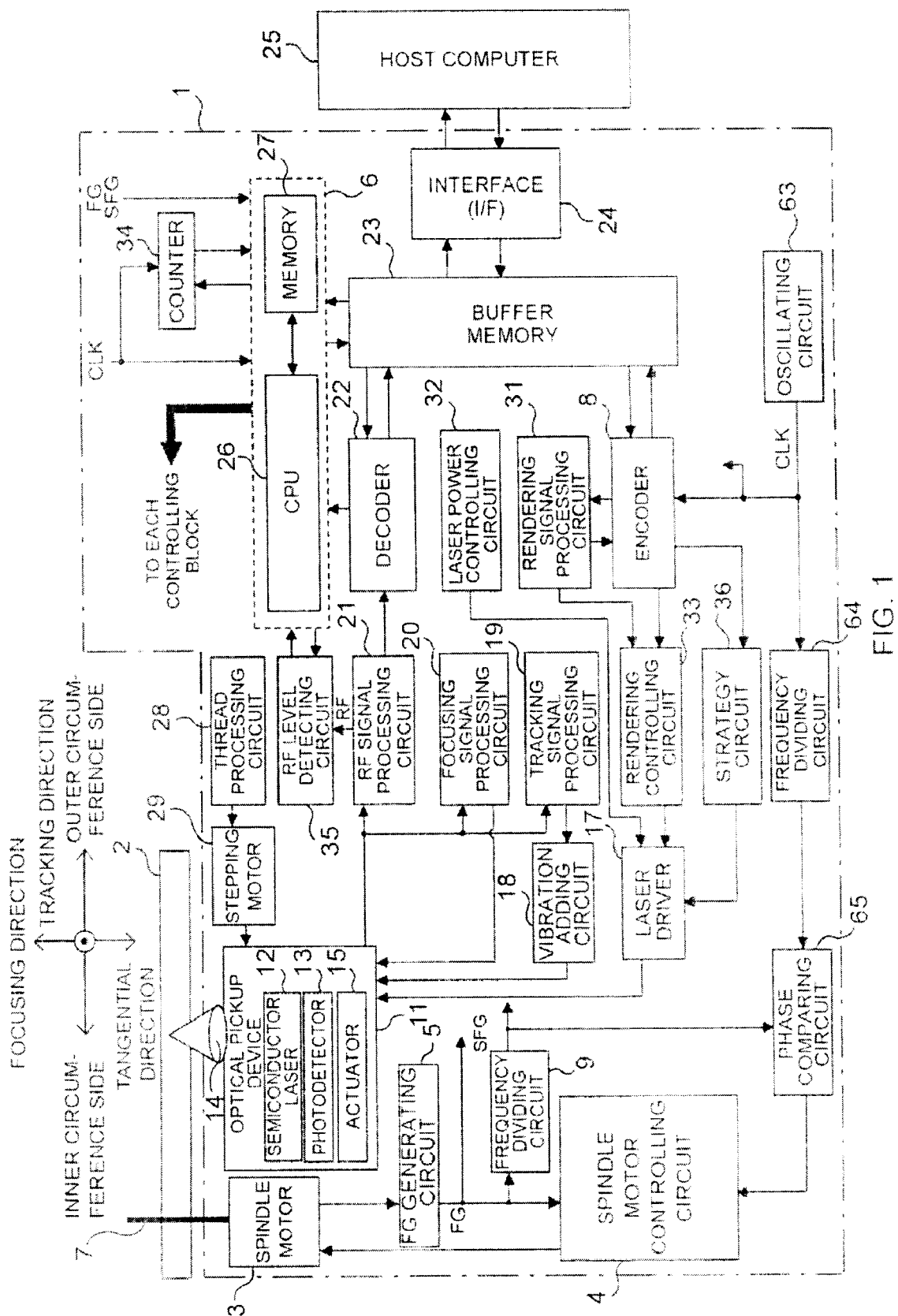
FIG. 1 is a block diagram of the entire configuration of an image information detecting apparatus according to the present invention.
Figure 7:
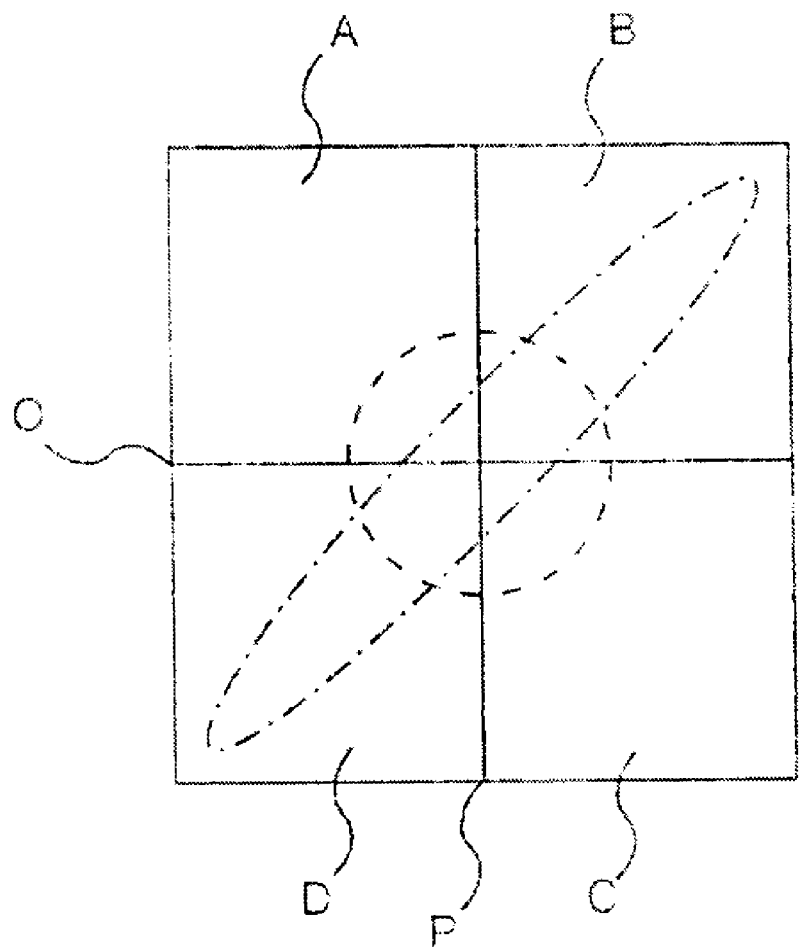
FIG. 7 shows a light receiving region of a photoconductor.

Hereinafter, an overall configuration of the image information detecting apparatus 1 according to the present invention will be described in accordance with FIGS. 1 and 7, referring to FIGS. 3 and 8 as appropriate. FIG. 1 is a block diagram showing an example of the overall configuration of the image information detecting apparatus 1 according to the present invention. FIG. 7 shows a light receiving regions A through D of a photodetector 13 (light receiving unit) shown in FIG. 1. Note that the following description will be given on the premise that the image information detecting apparatus 1 shown in FIG. 1 serves: not only to detect image information indicating an image from the color changing layer 102 after the image has been formed therein; but also to form the image for the color changing layer 102; as well as to record/reproduce information for a recording layer (not shown) if the recording layer is included in the optical disc 2. However, functions other than the function to detect the image information do not concern the subject matter of the present invention and the simplified description thereof will be given.

The image information detecting apparatus 1 has a spindle motor 3, a rotating shaft 7, a spindle motor controlling circuit 4, an FG operating circuit 5 (a synchronization controlling circuit and a rotation signal generating circuit), frequency dividing circuits 9 and 64 (a synchronization controlling circuit), an optical pickup device 11, an RF (Radio Frequency) signal processing circuit 21 (a light-receiving unit), a decoder 22, an RF level detecting circuit 35 (a detecting unit), a focusing signal processing circuit 20, a tracking signal processing circuit 19, a vibration adding circuit 18, a stepping motor 29, a thread processing circuit 28, a supervising controlling unit 6 (the detecting unit and the determining unit), a counter 34, a buffer memory 23, an interface (I/F) 24, an encoder 8, a rendering signal processing circuit 31, a rendering controlling circuit 33, a strategy circuit 36, a laser power controlling circuit 32, a laser driver 17, an oscillating circuit 63 (a clock generating circuit), and a phase comparing circuit 45 (the synchronization controlling circuit).

The spindle motor 3 is rotated by a control voltage applied from the spindle motor controlling circuit 4 to a spindle motor coil (not shown), thereby causing the optical disc 2 to rotate, the optical disc 2 being mounted by, for example, a chucking mechanism not shown fixed to the rotating shaft 7.

The FG generating circuit 5 generates an FG signal (rotation signal) at a frequency corresponding to the rotation speed of the spindle motor 3 based on, for example, a counter electromotive force generated when the spindle motor 3 rotates. In the embodiment, the description will be given assuming that the FG generating circuit 5 generates, for example, 18 pulses of FG signal per one round of the spindle motor 3 (per one round of the optical disc 2).

The frequency-dividing circuit 9 outputs an SFG signal formed by dividing the frequency of the FG signal from the FG generation circuit into pieces of ⅟₁₈ thereof each, to the phase comparing circuit 65 and the supervising controlling unit 6. That is, a term (cycle), for example, from the rise of the SFG signal to the rise of the next SFG signal represents a term during which the optical disc 2 is rotated for one round by the rotation of the spindle motor 3.

The oscillating circuit 63 produces a clock at a predetermined frequency (hereinafter, "CLE") and outputs CLE to the frequency dividing circuit 64, the encoder 8, the supervising controlling unit 6, and the counter 34. The SFG signal and the signal outputted by the frequency dividing circuit 64 are synchronized with each other by the control of the spindle motor controlling circuit 4 described later. Thereby, one cycle of CLK and the term during which the optical disc 2 rotates for one column (the minimal distance moved in the rotation direction) are synchronized with each other.

The frequency dividing circuit 64 outputs a signal formed by frequency-dividing CLK from the oscillating circuit 63 to pieces of 1/n thereof each ("n" is the number of the columns. See FIG. 3.) to the phase comparing circuit 65. As a result, similarly to the above SFG signal, the term (cycle) from the rise of the signal outputted by the frequency dividing circuit 64 to the rise of the next signal represents a term during which the optical disc 2 rotate for one round by the rotation of the spindle motor 3.

The phase comparing circuit 65 outputs the comparison result obtained by comparing the phases respectively of, for example, the rise of the SFG signal and the rise of the signal from the frequency dividing circuit 64, to the spindle motor controlling circuit 4.

The spindle motor controlling circuit 4 controls the spindle motor 3 based on a controlling signal from the supervising controlling unit 6 to adjust the rotation speed of the optical desk 2 to the rotation speed indicated by the controlling signal. Therefore, the spindle motor controlling circuit 4 detects the actual rotation speed of the optical disc 2 based on the FG signal and, to adjust the actual rotation speed to the rotation speed indicated by the controlling signal, controls the level of a controlling voltage applied to the spindle motor 3. In the embodiment, the description will be given assuming that the spindle motor controlling circuit 4 controls the spindle motor 3 based on the controlling signal from the supervising controlling unit 6 to rotate the optical disc 2 in, for example, a CAV (Constant Angular Velocity) rotation scheme. The spindle motor controlling circuit 4 controls the level of the controlling voltage applied to the spindle motor 3 based on the comparison result from the phase comparing circuit 65 to synchronize the SFG signal and the signal from the frequency dividing circuit 64 with each other. The spindle motor controlling circuit 4 controls the level of the controlling signal applied to the spindle motor 3 based on the controlling signal from the supervising controlling unit 6 to synchronize, for example, the rise of the SFG signal with the timing at which the laser light beam is applied to the reference position of the optical disc 2.

An optical pickup device 11 has a semiconductor laser 12, a photodetector 13, an objective lens 14, and an actuator 15. Not shown due to not relating to the subject matter of the present invention, the optical pickup device 11 has the various optical systems (a collimator lens, a beam splitter, an anamorphic lens, etc.), a front monitor diode, etc. that an ordinary optical pickup device has.

The semiconductor laser 12 emits a laser light beam having an intensity corresponding to a current generated by the controlling signal from a laser driver 17 based on the controlling signal. The laser light beam from the semiconductor laser 12 passes through and is reflected by the various optical systems and, thereafter, impinges on the objective lens 14.

The objective lens 14 is disposed in a lens holder (not shown) of the actuator 15 and is held at a position facing a face on one side of the optical disc 2 (the face on the side that has the lead-in region and the image region) by the elastic force of a metal spring (not shown), etc. The objective lens 14 converts the laser light beam into a converging light beam and applies the light beam to the optical disc 2. The objective lens 14 converts a reflected light beam of the laser light beam applied to the color changing layer 102 or the recording layer into a parallel light beam and applies the parallel light beam to the various optical systems.

The photodetector 13 is disposed at a position with which the reflected light beam after passing through the anamorphic lens of the various optical systems becomes a minimal circle of confusion. More specifically, referring to FIG. 7, the photodetector 13 has, for example, four light-receiving areas A to D to receive the reflected light beam. Two dividing lines O and P that divide the entire light-receiving area into the four light-receiving areas A to D cross each other at a right angle the direction of either one of the dividing liens (for example, the dividing line P) is provided such that the dividing line represents a tangential direction, when a push-pull scheme is used in the tracking control. The light-receiving areas A to B are provided such that the areas A to D are inclined at substantially 45° against the direction of astigmatism generation caused by the anamorphic lens. The photodetector 13 outputs photoelectric converted signals (electric signals) a to d respectively corresponding to the levels of the reflected light beam respectively received by the light-receiving areas A to D to the RF signal processing circuit 21, the focusing signal processing circuit 20, and a tracking signal processing circuit 19. In the image information detecting apparatus 1 shown in FIG. 1, though only one signal line is depicted from the optical pickup device 11 to the RF signal processing circuit 21, the focusing signal processing circuit 20, and the tracking signal processing circuit 19, signal lines of the number that enable the photoelectric converted signals a to d to be supplied to each of the above processing circuits are provided in practice.

The actuator 15 has a focusing coil (not shown) to change the position of the objective lens 14 in the focusing direction, a tracking coil (not shown) to change the position of the objective lens 14 in the tracking direction, etc.

When image information indicating an image is detected from the color changing layer 102 formed with the image (hereinafter, "image information detecting mode"), a focusing error signal from the focusing signal processing circuit 20 is supplied to the focusing coil and, thereby, the actuator 15 moves the objective lens 14 in the focusing direction by a move amount corresponding to the amplitude level of the focusing error signal. As a result, the laser light beam from the objective lens 14 can be focused on the color changing layer 102 of the optical disc 2. This focusing control is similarly executed in formation of an image to the color changing layer 102 (hereinafter, "image forming mode"), and recording and reproducing of information to/from the recording layer (hereinafter, "information recording/reproducing mode).

In the image information detecting mode, an AC signal from the vibration adding circuit 18 is supplied to the tracking coil and, thereby, the actuator 15 vibrates the objective lens 14 in the tracking direction. This vibration of the objective lens 14 is at a vibration frequency corresponding to the frequency of the AC signal and the vibration amplitude of the signal corresponds to the amplitude of the AC signal. In the image forming mode, the objective lens 14 is also vibrated to make the contrast of the image more excellent in selectivity. In the information recording/reproducing mode, the tracking error signal from the vibration adding circuit 18 is supplied to the tracking coil and, thereby, the actuator 15 moves the objective lens 14 in the tracking direction by a move amount corresponding to the amplitude level of the tracking signal. As a result, the laser light beam can be caused to follow the grooves, lands, etc., formed on the recording layer. In the image information detecting mode and the image forming mode, the tracking control may be unstable being attributed to the difference in position between the recording layer and the color changing layer 102 in the focusing direction, the light absorption of the color changing layer 102, etc., as above. Therefore, the tracking control is stopped.

In the image information detecting mode, the RF signal processing circuit 21 produces an RF signal (an electric signal) based on the photoelectric converted signals a to d from the photodetector 13 obtained when the laser light beam is applied to the lead-in region of the optical disc 2. The RF signal processing circuit 21 executes a gain control of the RF signal so as to be at the optimal level, executes an equalizing process to the RF signal, converts the RF signal into binary data, and outputs the binary data to the decoder 22. The RF signal processing circuit 21 produces an RF signal based on the photoelectric converted signals a to d from the photodetector 13 obtained when the laser light beam is applied to the color changing layer 102 and outputs the RF signal to the RF level detecting circuit 35. In the information recording/reproducing mode, the RF signal processing circuit 21 executes the same processing as the processing executed when the laser light beam is applied to the lead-in region of the optical disc 2.

In the image information detecting mode, the decoder 22 executes a decoding process supporting the standard of the optical disc 2 to the signal converted into the binary data from the RF signal processing circuit 21 and transmits the reference position information obtained as the result of the decoding process to the supervising controlling unit 6. The decoder 22 transmits to the buffer memory 23 the ATIP information, etc., obtained as the result of the decoding process. More specifically, the optical disc 2 supports the CD standard and, in the CD standard, EFM (Eight Fourteen Modulation) is employed as the modulation code and CIRC (Cross Interleaved Reed-Solomon Code) is employed as the error correcting code. Therefore, the decoder 22 executes the decoding process based on the modulation code and the error correcting code. When the optical disc 2 is a medium supporting a DVD standard, in the DVD standard, EFM-Plus (8-16) is employed as a modulation code and RS (Reed-Solomon) Product-Code is employed as the error correcting code. Therefore, the decoder 22 executes the decoding process based on the modulation code and the error correction code. In the information recording/reproducing mode, the decoder 22 executes a decoding process to detect the ATIP information, etc., and transmits to the buffer memory 23 the information obtained as the result of the decoding process. As a result, the information recorded in the recording layer of the optical disc 2 is reproduced by a host computer 25 through the interface 24.

The RF level detecting circuit 35 produces a digital signal (image information) corresponding to the level of the RF signal from the RF signal processing circuit 21 at the timing based on the signal from the supervising controlling unit 6, and transmits the digital signal to the supervising controlling unit 6. The details of the RF level detecting circuit 35 will be described later.

The focus signal processing circuit 20 produces the focusing error signal for focusing control based on the photoelectric converted signals a to d from the photodetector 13 and transmits the focusing error signal to the optical pickup device 11. When the astigmatism is employed for the focusing control, the focusing error signal is obtained by processing as calculating (a+c)−(b+d). Through as astigmatism method is employed for the focusing control in the embodiment, the method that may be employed is not limited to this. For example, a differential astigmatism method may be employed that provides a diffraction grating (not shown) to an optical system of the optical pickup device 11, causes the laser light beam from the semiconductor laser 12 to be diffracted into three light beams, and executes the focusing control based on reflected light beams from the optical disc 2 respectively of the three light beams.

In the information recording/reproducing mode, the tracking signal processing circuit 19 produces a tracking error signal for the tracing control based on the photoelectric converted signals a to d from the photodetector 13. When a push-pull method is employed for the tracking control, the tracking error signal is obtained by processing as calculating (a+d)−(b+c). In the image information detecting mode and the image forming mode, the tracking signal processing circuit 19 stops the tracking control as above regardless of the presence and absence of input of the photoelectric converted signals a to d from the photodetector 13. An example that has enabled the tracking control to be selective as above can be, for example, the case where the tracking control is enabled to be selective by providing a switching circuit (not shown) that is turned on or off based on an instruction signal from the supervising controlling unit 6 to the signal line that inputs the photoelectric converted signals a to d into the tracking signal processing circuit 19. Though the push-pull method is employed for the tracking control in the embodiment, the method that may be employed is not limited to this. For example, a differential push-pull method may be employed that provides a diffraction grating and executes tracking control based on the reflected light beams of the three light beams similarly to the differential astigmatism method as above.

In the image information detecting mode, the vibration adding circuit 18 transmits an AC signal for which the amplitude and the frequency thereof are controlled based on the controlling signal from the supervising controlling unit 6, to the optical pickup device 11. This AC signal is supplied to the tracking coil of the above actuator 15 and, thereby, the objective lens 14 is vibrated in the tracking direction. The same procedure is also taken in the image forming mode. In the information recording/reproducing mode, the vibration adding circuit 18 transmits the tracking error signal from the tracking signal processing circuit 19 to the optical pickup device 11 based on the controlling signal from the supervising controlling unit 6.

The controlling voltage from the thread processing circuit 28 is applied to the stepping motor coil (not shown) and, thereby, the stepping motor 29 rotates by the amount of a stepping distance corresponding to the level of the controlling voltage and moves the optical pickup device 11 in the tracking direction. That is, the distance moved by the optical pickup device 11 in the tracking direction corresponds to the stepping distance of the stepping motor 29.

The thread processing circuit 28 thread-control the stepping motor 29 based on the controlling signal from the supervising controlling unit 6 such that the distance moved by the optical pickup device 11 in the tracking direction is a distance of move that corresponds to the controlling signal. Therefore, the thread processing circuit 28 applies the controlling voltage corresponding to the distance of move indicated by the controlling signal, to the stepping motor 29. In the embodiment, the description will be given assuming that the thread processing circuit 28 thread-controls the stepping motor 29 such to, for example, move the optical pickup device 11 from the inner circumference side to the outer circumference side of the optical disc 2. The description will be given also assuming that the minimal distance moved by the optical pickup device 11 to the outer circumference side (the minimal distance moved in the radial direction) corresponding to the minimal stepping distance of the stepping motor 29 by the thread control is equal to the distance between adjacent lines of the optical disc 2.

The interface 24 is provided for, for example, the host computer 25 and the image information detecting apparatus 1 connected with each other through a connecting terminal (not shown) to transmit and receive data. An example of the standard of the interface 24 can be ATAPI (AT Attachment Packet Interface) standard, SCSI (Small Computer System Interface) standard, IEEE (Institute of Electrical and Electronic Engineers) 1394 standard, USB (Universal Serial Bus) standard, etc.

In the image information detecting mode, the buffer memory 23 holds the judgment result from the supervising controlling unit 6. The buffer memory 23 holds information obtained as the result of the decoding process of the decoder 22. The buffer memory 23 also holds recording data to record in the recording layer transmitted from the host computer 25 in the information recording/reproducing mode. The buffer memory 23 also holds data in the bitmap format to form an image to the color changing layer 102 transmitted from the host computer 25 in the image forming mode. The image information detecting apparatus 1 and the host computer 25 read at a predetermined timing the data held in the buffer memory 23, and execute a predetermined process to the data.

The encoder 8 executes encoding processes such as EFM modulation that is a modulation code supporting the CD standard, etc., to the recorded data and data in the bitmap format from the buffer memory 23. In the encoding process in the image forming mode, the encoder 8 converts the data in the bitmap format from the buffer memory 23 into data consisting of contrast data groups (hereinafter, "image forming data") indicating the light-dark state (hereinafter, "contrast") of each dot consisting of the image corresponding to the shape of the optical disc 2 shown in FIG. 3. Referring to FIG. 3, detailed description will be given for the image forming data after application of the encoding process by the encoder 8. In the color changing layer 102, each dot consisting the image is arranged at each intersection of a radial line (a column) from the center of the optical disc 2 and a concentric circle (row) thereon. Each contrast data constituting the image forming data corresponds to each dot and indicates information that indicates the contrast of each dot. The information indicating the contrast of each dot is three-bit data that enables the contrast of the image formed in the color changing layer 102 to be selective from, for example, sight (=the cute of two) levels of gray according to light-dark state information indicated by the data in the bitmap format. In the image forming mode, the image information detecting apparatus 1 rotates the optical disc 2 for at most seven rounds per image forming for one row to enable an image of sigh levels of gray to be formed. When the contrast data is, for example, "111", the apparatus 1 sets the light intensity of the laser light beam to the dot at a level that can form the image in all the seven rounds of the optical disc 2 to make the dot according to the contrast data deepest in tone (dark). That is, in all the rounds of the optical disc 2 for which −1 that is the value representing the three-bit data in the decimal system is shown, the apparatus 1 sets the light intensity of the laser light beam at the level that can form the image. The reflectance of the dot according to the contrast data "111" against the laser light beam is the maximum. Under this condition, when the contrast data is "000", the dot according to the contrast data is shallowest in tone (light). The reflectance of the dot according to the contrast data "000" against the laser light beam is the minimum. The encoder 8 transmits sequentially to the rendering controlling circuit 33 the contrast data constituting the image forming data at each timing of, for example, the rise of CLK from the oscillating circuit 63.

When the rendering signal processing circuit 31 detects the image forming data from the data that has undergone the encoding process in the encoder 8, the circuit 31 transmits an instructing signal to execute a process as described later in the rendering controlling circuit 33. When the rendering signal processing circuit 31 does not detect the image forming data (that is, in the information recording/reproducing mode), the circuit 31 transmits the recorded data to the strategy circuit 36.

In the image information detecting mode, during the terms of the image information detecting mode, the rendering controlling circuit 33 transmits to the laser driver 17 a signal (hereinafter, "servo signal A") to set the light intensity of the laser light beam at least at a level that can execute the focus control based on the instructing signal from the supervising controlling unit 6. In the image forming mode, when the contrast data from the encoder 8 is data indicating the formation of the image to the color changing layer 102, the rendering controlling circuit 33 transmits to the laser driver 17 a pulse (hereinafter, "image forming pulse") to set the light intensity of the laser light beam at a level that can form the image (>the level that can execute the focus control). During the term of the image forming mode, the rendering controlling circuit 33 transmits the above servo signal A to the laser driver 17.

In the information recording/reproducing mode, the strategy circuit 36 controls the controlling signal supplied from the laser driver 17 to the semiconductor laser 12 based on the recorded data from the encoder 8. For example, when the recorded data is the data indicating pit formation to a groove formed on the recording layer, the strategy circuit 36 transmits to the laser driver 17 a pulse (hereinafter, "pit forming pulse") to set the light intensity of the laser light beam at a level that can execute the pit information. During the term of the information recording/reproducing mode according to the recorded data, the strategy circuit 36 transmits to the laser driver 17 a signal (hereinafter, "servo signal B") to set the light intensity of the laser light beam at least at a level that can execute the focus control (<the level that can execute the pit formation). During the information recording/reproducing mode according to the signal instructing reproducing, the strategy circuit 36 transmits the above servo signal B to the laser driver 17.

The laser power controlling circuit 32 has an APC (Automatic Power Control) circuit, detects the light intensity of the laser light beam received by the front monitor diode of the optical pickup device 11, and calculates the light intensity of the laser light beam actually applied to the color changing layer 102 or the recording layer. The laser power controlling circuit 32 transmits a controlling signal to the laser driver 17 to set the light intensity of the laser light beam applied actually to the color changing layer 102 or the recording layer at a light intensity indicted by the controlling signal from the supervising controlling unit 6. More specifically, during the term of the image information detecting mode, the laser power controlling circuit 32 transmits to the laser driver 17 a controlling signal to set the laser light beam actually applied to the color changing layer 102 to a laser light beam at the level that can execute the focus control. In the image forming mode, when the rendering controlling circuit 33 does not transmit the image forming pulse to the laser driver 17, the laser power controlling circuit 32 transmits to the laser driver 17 a controlling signal to set the laser light beam actually applied to the color changing layer 102 to a laser light beam at the level that can execute the focus control. When the rendering controlling circuit 33 transmits the image forming pulse to the laser driver 17 in the image forming mode, the laser power controlling circuit 32 transmits to the laser driver 17 a controlling signal to set the laser light beam actually applied to the color changing layer 102 to a laser light beam at the level that can form the image to the color changing layer 102. During the term of the information recording/reproducing mode based on the signal instructing reproduction, the laser power controlling circuit 32 transmits to the laser driver 17 a controlling signal to set the laser light beam actually supplied to the recording layer to a laser light beam at the level that can execute the focus control. In the information recording/reproducing mode based on the recorded data, when the strategy circuit 36 does not transmit the pit forming pulse to the laser driver 17, the laser power controlling circuit 32 transmits to the laser driver 17 a controlling signal to set the laser light beam actually applied to the recording layer to a laser light beam at the level that can execute the focus control. In the information recording/reproducing mode based on the recorded data, when the strategy circuit 36 transmits the pit forming pulse to the laser driver 17, the laser power controlling circuit 32 transmits to the laser driver 17 a controlling signal to set the laser light beam actually applied to the recording layer to a laser light beam at the level that can form a bit to the groove in the recording layer.

Because a CAV scheme is employed as the rotation scheme of the optical disc 2 in the embodiment, the linear velocity of the optical disc 2 is increased as the optical pickup device 11 moves from the inner circumference side to the outer circumference side. Therefore, the laser power controlling circuit 32 transmits to the laser driver 17 a controlling signal that increases the light intensity of the laser light beam as the optical pickup device 11 moves toward the outer circumference side based on the controlling signal from the supervising controlling unit 6 based on the amount of move of the optical pickup device 11 according to the thread control.

The laser driver 17 has a recording terminal (not shown) into which the image forming pulse or the pit forming pulse is inputted. The laser driver 17 has a reproducing terminal (not shown) into which the servo signal A or the servo signal B is inputted. In the image information detecting mode, the laser driver 17 supplies to the semiconductor laser 12 a controlling signal corresponding to the controlling signal from the laser power controlling circuit 32 and the servo signal A inputted into the reproducing terminal. As a result, during the term of the image information detecting mode, the semiconductor laser 12 emits the laser light beam at the level that can execute the focus control. During the term of the image forming mode, the laser driver 17 continues to supply to the semiconductor laser 12 a controlling signal corresponding to the controlling signal from the laser power controlling circuit 32 and the servo signal A inputted to the reproducing terminal and, when the image forming pulse is inputted into the recording terminal, supplies to the semiconductor laser 12 a controlling signal formed by superimposing the image forming pulse onto the controlling signal. As a result, when no image forming pulse is inputted into the recording terminal, the semiconductor laser 12 emits the laser light beam at the level that can execute the focus control and, when the image forming pulse is inputted into the recording terminal, emits the laser light beam at the level that can form the image to the color changing layer 102. During the term of the information recording/reproducing mode according to the signal instructing reproduction, the laser driver 17 supplies to the semiconductor laser 12 a controlling signal corresponding to the controlling signal from the laser power controlling circuit 32 and the servo signal B inputted into the reproducing terminal. As a result, during the information recording/reproducing mode according to the signal instructing reproduction, the semiconductor laser 12 emits the laser light beam at the level that can execute the focus control. During the information recording/reproducing mode according to the recorded data, the laser driver 17 continues to supply to the semiconductor laser 12 a controlling signal corresponding to the controlling signal from the laser power controlling circuit 32 and the servo signal B inputted into the reproducing terminal and, when the pit forming pulse is inputted into the recording terminal, supplies to the semiconductor laser 12 a controlling signal formed by superimposing the pit forming pulse onto the controlling signal. As a result, when no pit forming pulse is inputted into the recording terminal, the semiconductor laser 12 emits the laser light beam at the level that can execute the focus control and, when the pit forming pulse is inputted into the recording terminal, emits the laser light beam at the level that can form the pit to the groove on the recording layer.

The counter 34 counts, for example, the rise of CLK from the oscillating circuit 63. The counter 34 resets the count value thereof based on the instructing signal from the supervising controlling unit 6 issued when the count value of the counter 34 has reached "n" (the number of columns).

The supervising controlling unit 6 has a CPU (Central Processing Unit) 26 and a memory 27. The CPU 26 supervises and controls the image information detecting apparatus 1 such that the image information detecting apparatus 1 executes the processes in the image information detecting mode (or the image forming mode, or the information recording/reproducing mode) based on the instructing signals from, for example, the host computer 25. The memory 27 stores in advance program data for the CPU 26 to supervise and control in corresponding to each mode. This memory 27 consists of, for example, a non-volatile storage device such as a mask ROM (Read Only Memory) to which data is fixed by printing in a manufacturing process, an EPROM (Erasable Programmable ROM) to/from which data can be repeatedly written and read by erasing data with a UV light beam, an EEPROM (Electronically Erasable Programmable ROM) to/from which data can be repeatedly written and read by electrically erasing data, and a flush ROM.

During the term of the image information detecting mode, the supervising controlling unit 6 transmits an instructing signal to the rendering controlling circuit 33 to cause the rendering controlling circuit 33 to transmit the servo signal A to the laser driver 17. The supervising controlling unit 6 determines a rotation scheme to be applied to the optical disc 2 based on the ATIP information, etc., from the decoder 22 obtained when the laser light beam is applied to the lead-in region. At this time, the rotation scheme selected by the supervising controlling unit 6 is the CAV scheme as above. The supervising controlling unit 6 transmits to the spindle motor controlling circuit 4 a controlling signal to make the angular velocity of the optical disc 2 constant. The supervising controlling unit 6 determines that the laser light beam is applied to the reference position based on the reference position information from the decoder 22 obtained when the laser light beam is applied to the lead-in region. The supervising controlling unit 6 transmits a controlling signal to the spindle motor controlling circuit 4 to synchronize, for example, the timing at which the reference position information from the decoder 22 and the rise of the SFG signal with each other. The supervising controlling unit 6 calculates application position information of the laser light beam in the image region based on information indicating the amount of move in the tracking direction of the optical pickup device 11 according to the thread control of the thread processing circuit 28 and the count value of the counter 34. More specifically, the supervising controlling unit 6 transmits to the thread processing circuit 28 a controlling signal to move the optical pickup device 11 in the tracking direction. That is, in the process of producing the controlling signal, the supervising controlling unit 6 has already obtained the information of the amount of the move to calculate the amount of the move in the tracking direction of the optical pickup device 11. As a result, the supervising controlling unit 6 can determine which row the laser light beam is being applied to in the image region based on the information of the amount of the move. The supervising controlling unit 6 can determine which column the laser light beam is being applied to in the image region based on the count value of the counter 34. From these results, the supervising controlling unit 6 calculates the application position that the laser light beam is applied to the image region.

The supervising controlling unit 6 transmits a signal (hereinafter, "timing signal") for the RF level detecting circuit 35 to output a digital signal at a timing, for example, the rise of CLK. The supervising controlling unit 6 transmits a signal (hereinafter, "reference level signal") for setting: for example, the minimal value of the level of the RF signal obtained at the time of application of the laser light beam to the image region as the initial operation before detection of the image information from the color changing layer 102; to a reference level Ref described later of the RF level detecting circuit 35. The supervising controlling unit 6 determines whether an image is formed to the color changing layer 102 based on the digital signal from the RF level detecting circuit 35, and transmits the judgment result to, for example, the buffer memory 23.

To control the frequency of the AC signal that is supplied by the vibration adding circuit 18 to the optical pickup device 11, the supervising controlling unit 6 transmits to the vibration adding circuit 18 a controlling signal that sets the frequency of the AC signal to, for example, a frequency other than the resonance frequency of the actuator 15 and a frequency other than a frequency that is an integral multiple equal to a larger than one of the rotation frequency of the optical disc 2. To control the amplitude of the AC signal, the supervising controlling unit 6 transmits to the vibration adding circuit 18 a controlling signal to set the AC signal to an AC signal having the amplitude thereof of a size, for example, equal to the minimal distance moved by the optical pickup device 11 according to the thread control.

<<Details of RF Level Detecting Circuit 35>>

Figure 2:
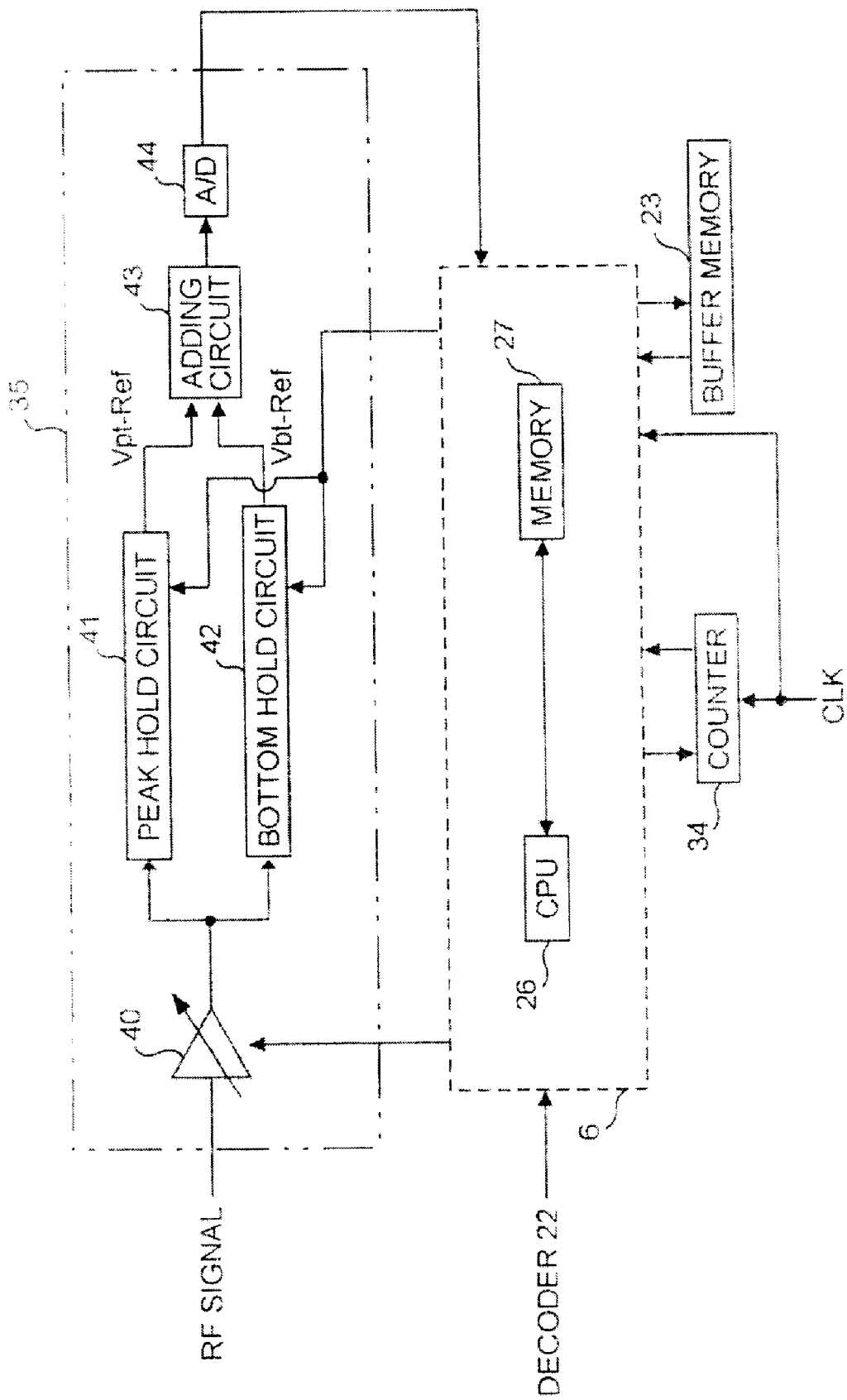
FIG. 2 shows the details and peripheral circuits of an RF level detecting circuit.

Referring to FIG. 2, detailed description will be given for the RF level detecting circuit 35. FIG. 2 is a block diagram of an example of the configuration and peripheral diagram of an example of the configuration and peripheral circuits of the RF level detecting circuit 35.

The RF level detecting circuit 35 has a variable amplifying circuit 40, a peak hold circuit 41 (holding unit), a bottom hold circuit 42 (holding unit), an adding circuit 43, and an AD converter 44 (determining unit). In the variable amplifying circuit 40, the gain thereof is set by, for example, the controlling signal from the supervising controlling unit 6 and the RF signal from the RF signal processing circuit 21 is amplified with the gain and is outputted to the peak hold circuit 41 and the bottom hold circuit 42. The gain of the variable amplifying circuit 40 is a value determined such that the AD converter 44 outputs the digital signal that is the image information reflected correctly with the presence of the absence of an image to be formed in the color changing layer 102.

The reference level Ref of the peak hold circuit 41 is set based on the reference level signal from the supervising controlling unit 6. The peak hold circuit 41 holds the peak level of the RF signal amplified relative to the reference level Ref during the term until the next timing signal from the supervising controlling unit 6 is received (a cycle of CLK, a term during which the optical disc 2 moves rotating on each column) based on a timing signal from the supervising controlling unit 6. The peak hold circuit 41 outputs to the adding circuit 43 a signal Vpt-Ref indicating the peak level of the amplified RF signal based on the next timing signal. The peak hold circuit 41 holds the peak level of the RF signal amplified relative to the reference level Ref during the term until the timing signal after next time from supervising controlling unit 6 is received based on the next timing signal. As above, the peak hold circuit 41 holds the peak level of the amplified RF signal relative to the reference level Ref and outputs the signal Vpt-Ref indicating the peak level of the amplified RF signal based on the timing signals transmitted sequentially from the supervising controlling unit 6.

The reference level Ref of the bottom hold circuit 42 is set based on the reference level signal from the supervising controlling unit 6. The bottom hold circuit 42 holds the bottom level of the RF signal amplified relative to the reference level Ref during the term unit the next timing signal from the supervising controlling unit 6 is received based on the timing signal from the supervising controlling unit 6. The bottom hold circuit 42 outputs to the adding circuit 43 a signal Vbt-Ref indicating the bottom level relative to the reference level Ref based on the next timing signal. The bottom hold circuit 42 holds the bottom level of the RF signal amplified relative to the reference level Ref during the term until the timing signal after next from the supervising controlling unit 6 is received based on the next timing signal. As above, the bottom hold circuit 42 holds the bottom level of the amplified RF signal relative to the reference level Ref and outputs the signal Vbt-Ref indicating the bottom level of the amplified RF signal based on the timing signals transmitted sequentially from the supervising controlling unit 6.

In the embodiment, the peak hold circuit 41 and the bottom hold circuit 42 are provided such that this circuit 41 and the circuit 42 respectively output the signals Vpt-Ref and Vbt-Ref based on the timing signals from the supervising controlling unit 6 in response to the rises of CLK. However, the provision of the circuits is not limited to this. For example, the peak hold circuit 41 and the bottom hold circuit 42 may be provided such that CLK is directly supplied to the circuits 41 and 42 and the signals Vpt-Ref and Vbt-Ref are outputted at the timing of, for example, the rise of the CLK. In this case, the load of the process for the supervising controlling unit 6 to produce the timing signal can be reduced.

The adding circuit 43 outputs to the AD converter 44 the addition result (Vpt-Ref)+(Vbt-Ref) (the image information) obtained by adding the signal Vpt-Ref from the peak hold circuit 41 and the signal Vbt-Ref from the bottom hold circuit 42.

The AD converter 44 outputs to the supervising controlling unit 6, for example, a one-bit (a predetermined number of bits) digital signal (the image information) corresponding to the addition result (Vpt-Ref)+(Vbt-Ref) from the adding circuit 43. Detailed description will be given for the relation between the digital signal that is the image information and the image formed in the color changing layer 102. The color changing layer 102 has a characteristic that the reflectance thereof increases by being applied with a laser light beam (that is, an image is formed). As a result, the level of an RF signal obtained when a laser light beam is applied to the color changing layer 102 after an image has been formed therein is higher than that of an RF signal obtained when a laser light beam is applied to the color changing layer 102 with no image formed therein. The addition result (Vpt-Ref)+(Vbt-Ref) of the adding circuit 43 obtained when a laser light beam is applied to the color changing layer 102 after an image has been formed therein is larger than the addition result (Vpt-Ref)+(Vbt-Ref) of the adding circuit 43 obtained when a laser light beam is applied to the color changing layer 102 with no image formed therein. The AD converter 44 sets in advance the slice level for converting the addition result (Vpt-Ref)+(Vbt-Ref) into a one-bit digital signal (a reference level) to, for example, an intermediate level between the addition result (Vpt-Ref)+(Vbt-Ref) obtained when a laser light beam is applied to the color changing layer 102 after an image has been formed therein and the addition result (Vpt-Ref)+(Vbt-Ref) obtained when a laser light beam is applied to the color changing layer 102 with no image formed therein. As a result, when the addition result (Vpt-Ref)+(Vbt-Ref) obtained when the laser light beam is applied to the color changing layer 102 after an image has been formed therein is inputted, the AD converter 44 can output a digital signal of one logic value (for example, "1"). When the addition result (Vpt-Ref)+(Vbt-Ref) obtained when the laser light beam is applied to the color changing layer 102 with no image formed therein is inputted, the AD converter 44 can output a digital signal of the other logic value "0". Though the description is given assuming that the AD converter 44 outputs the one-bit digital signal in the embodiment, the digital signal is not limited to this. For example, when a digital signal of a plurality of bits indicating the contrast information of the image formed in the color changing layer 102 is desired, the AD converter 44 may be provided having a bit resolution higher than one bit (for example, three-bit resolution because images with eight levels of gray (three-bit) are formed in the image forming). As a result, the AD converter 44 outputs a digital signal of a plurality of bits indicating the contrast of the image formed in the color changing layer 102. The reason why the AD converter 44 having the one-bit resolution is used in the embodiment is facilitation of cost reduction and circuit scale simplification of the AD converter 44.

In the embodiment, the reason why the RF level detecting circuit 35 is configured by the peak hold circuit 41, the bottom hold circuit 42, and the adding circuit 43 is that, when, for example, a noise component, etc., are generated at the bottom level of the RF signal, by adding the signal Vpt-Ref indicating the peak level relative to the reference level Ref and the signal Vbt-Ref indicating the bottom level relative to the reference level Ref, influence on the image information caused by the noise component, etc., can be reduced comparing with the case where the circuit 35 is configured by only one (for example, the bottom hold circuit 42) of the circuits. More specifically, taking the input into the AD converter 44 (the adding result of the adding circuit 43) as the denominator and the noise component as the numerator, the result (numerator/denominator) obtained when the configuration includes the two is smaller than the result obtained when the configuration includes only one of the two. That is, the SN ratio of the image information detected by the image information detecting apparatus 1 can be improved. The level can be made higher by adding the signal Vpt-Ref indicating the peak level relative to the reference level Ref an the signal Vbt-Ref indicating the bottom level relative to the reference level Ref. By improving the bit resolution of the AD converter 44, the digital signal of a plurality of bits indicating the contrast of the image formed in the color changing layer 102 can be outputted.

<<Operation of Image Information Detecting Apparatus 1>>

Figure 4:
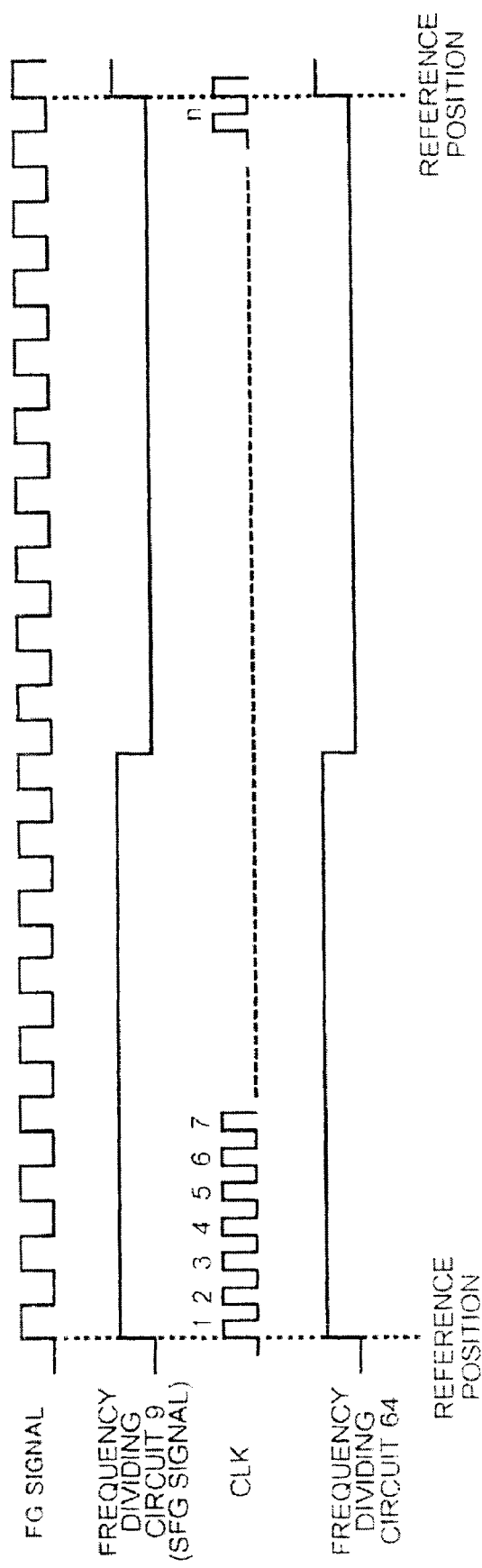
FIG. 4 is a timing chart of operation of the image information detecting apparatus according to the present invention.
Figure 5:
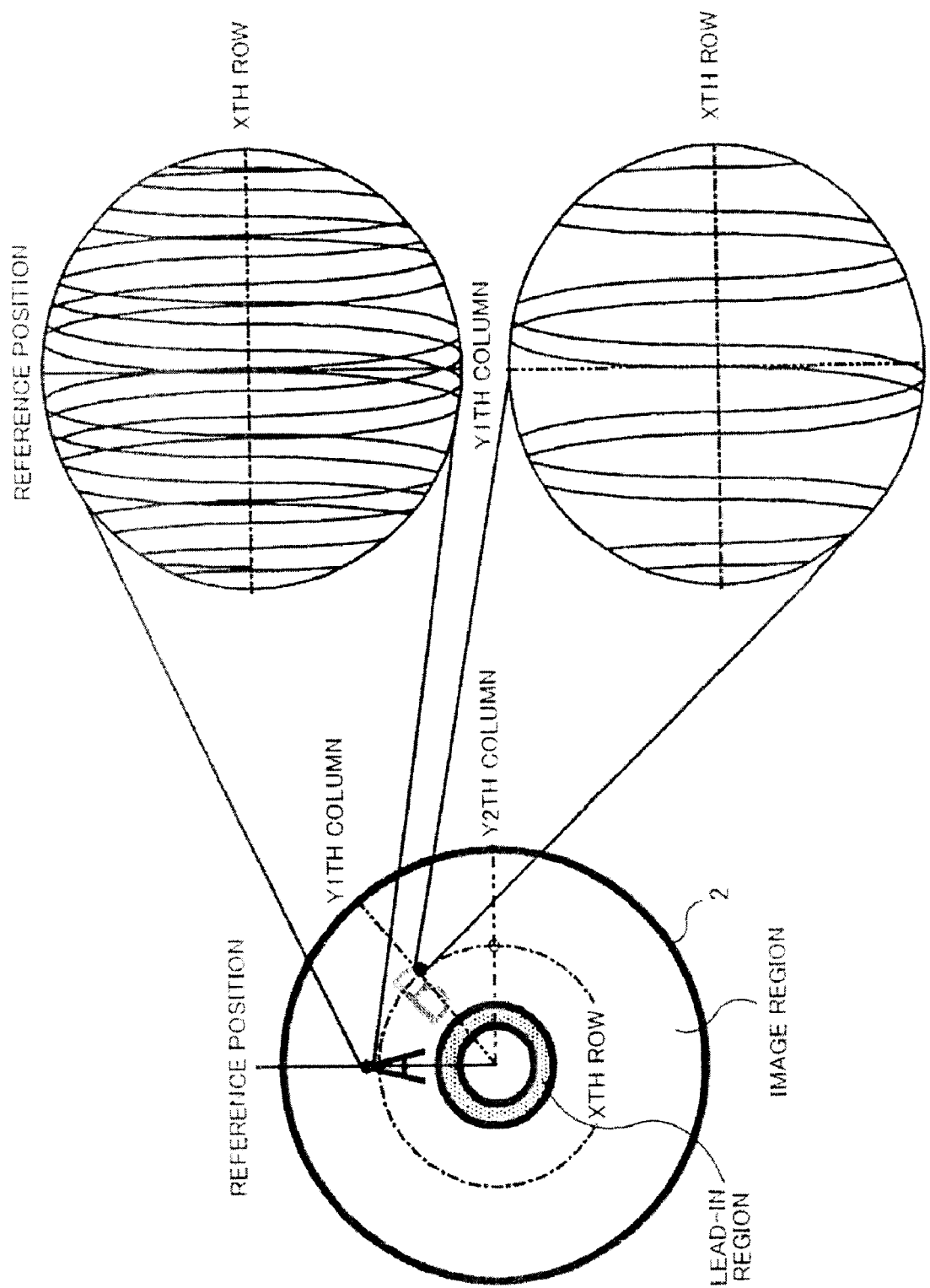
FIG. 5 shows an example of an image formed in a color changing layer.
Figure 6A:
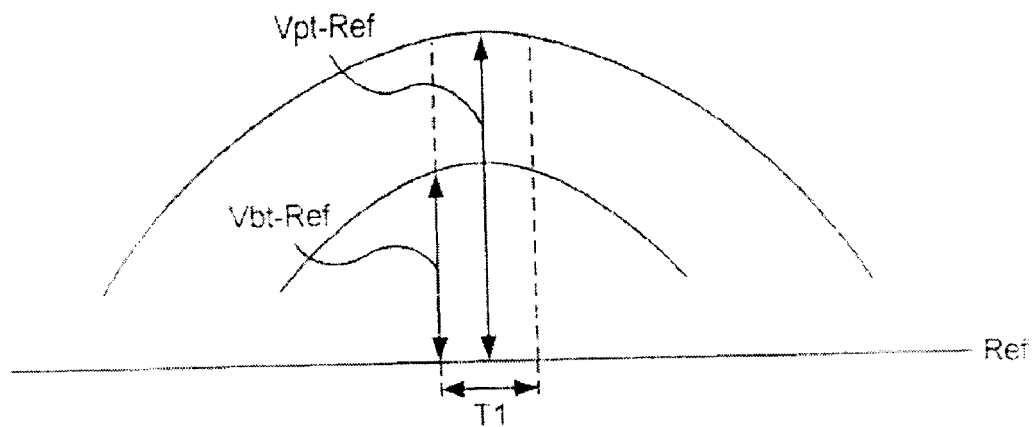
FIGS. 6A to 6C show a peak level and a bottom level of an RF signal.
Figure 6B:
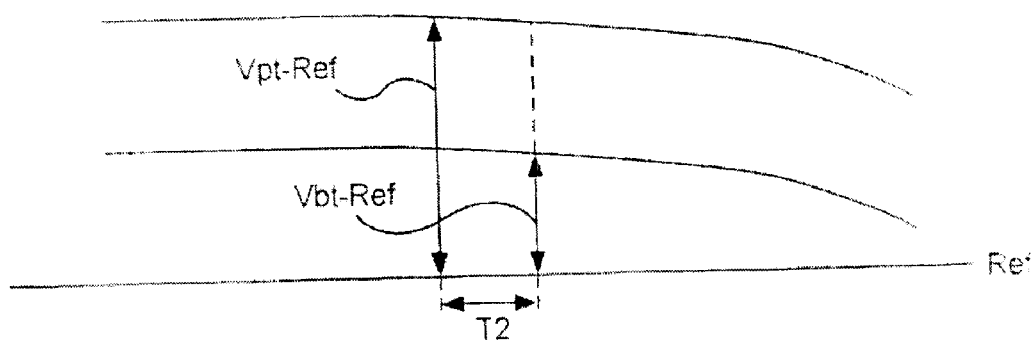
Figure 6C:
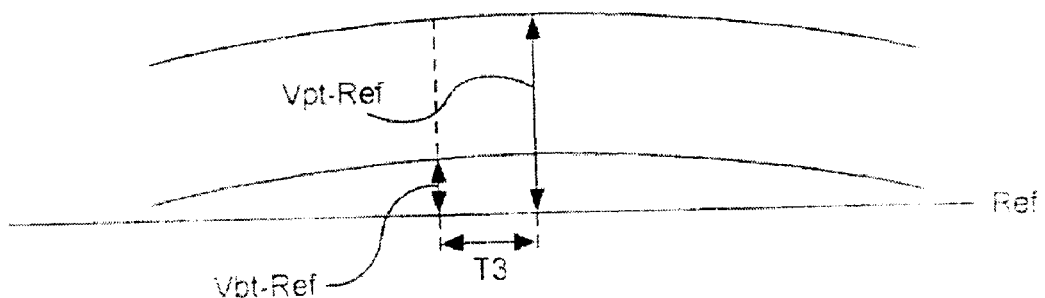

Referring to FIGS. 4 to 6, description will be given for an example of operation of the image information detecting apparatus 1 in the image information detecting mode according to the present invention also referring to FIGS. 1 to 3 when necessary. FIG. 4 is a timing chart of operation of the image information detecting apparatus 1 according to the present invention. FIG. 5 shows an example of an image formed in the color changing layer 102 of the optical disc 2. FIG. 6 shows a waveform of the peak level and the bottom level of the RF signal amplified by the variable amplifying circuit 40. In the embodiment, description will be given for the operation of the image information detecting apparatus 1 taken when the apparatus 1 detects the image information indicating an image formed on, for example, each do tin the "x"th row in the first column (the reference position), the "x"th row in the Y1th column, and the "x"th row in the Y2th column as shown in FIG. 5.

The supervising controlling unit 6 sets the image information detecting apparatus 1 in the image information detecting mode based on an instructing signal from, for example, the host computer 25 to detect the image information indicating the image from the color changing layer 102 after the image has been formed therein. When, for example, the optical disc 2 is mounted on the chucking mechanism and the supervising controlling unit 6 detects pulling-in of the optical disc 2, the supervising controlling unit 6 transmits an instructing signal to the rendering controlling circuit 33 to cause the semiconductor laser 12 to emit a laser light beam. The rendering controlling circuit 33 transmits the servo signal A to the laser driver 17 based on the instructing signal from the supervising controlling unit 6. The supervising controlling unit 6 transmits to the laser power controlling circuit 32 a controlling signal to set the light intensity of the laser light beam actually supplied to the color changing layer 102 to a level that can execute the focus control. The laser power controlling circuit 32 transmits to the laser driver 17 a controlling signal based on the controlling signal from the supervising controlling unit 6. The laser driver 17 supplies to the semiconductor laser 12 a controlling signal according to the controlling signal from the laser power controlling circuit 32 and the servo signal A from the rendering controlling circuit 33. The semiconductor laser 12 emits a laser light beam having a light intensity corresponding to a current generated by the controlling signal from the laser driver 17. The laser light beam from the semiconductor laser 12 impinges on the objective lens 14 after passing through and being reflected by, etc., various optical systems, is converted into a converging light beam by the objective lens 14, and impinged on the optical disk 2. The supervising controlling unit 6 transmits a controlling signal to the thread processing circuit 28 to apply the laser light beam to the lead-in region of the optical disc 2. Based on the controlling signal from the supervising controlling unit 6, the thread processing circuit 28 applies to the stepping motor 29 a controlling voltage to set the distance of move of the optical pickup device 11 to the distance of move facing the lead-in region of the optical disc 2. The stepping motor 29 rotates for a stepping distance corresponding to the level of the controlling voltage. As a result, the laser light beam is applied to the lead-in region of the optical disc 2.

A reflected light beam of the laser light beam from the lead-in region of the optical disc 2 is converted by the objective lens 14 into a parallel light beam and, after passing through and being reflected by, etc., various optical systems, and is received by the photodetector 13. The photodetector 13 outputs the photoelectric converted signals a to d corresponding to the level of the reflected light beam received by the light-receiving areas A to D to the RF signal processing circuit 21, the focus signal processing circuit 20, and the tracking signal processing circuit 19. Omitting the description because not concerning the subject matter of the present invention, the focus signal processing circuit 20 executes the focus control based on the photoelectric converted signals a to d during the term of the image information detecting mode. As described above, in the image information detecting mode, the tracking signal processing circuit 19 does not produce any tracking error signal regardless of presence or absence of any input of the photoelectric converted signals a to d based on, for example, the controlling signal from the supervising controlling unit 6 to stop the tracking control.

In the RF signal processing circuit 21, the photoelectric converted signals a to d are produced as an RF signal indicating the information recorded in the lead-in region, and undergo gain control and an equalizing process and, thereafter, are converted into binary data. The signal converted into the binary data undergoes a decoding process by the decoder 22 and the reference position information obtained as the result of the decoding process is transmitted to the supervising controlling unit 6. To synchronize the reception of the reference position information from the decoder 22 and a rise of the SFG signal with each other, the supervising controlling unit 6 transmits a controlling signal to the spindle motor controlling circuit 4. The ATIP information, etc., obtained a the result of the decoding process are transmitted to the buffer memory 23. Based on the ATIP information, et., the supervising controlling unit 6 determines the rotation scheme of the optical disc 2 as the CAV scheme and transmits a controlling signal to the spindle motor controlling circuit 4 to rotate the optical disc 2 at a constant angular velocity.

Based on the controlling signal from the supervising controlling unit 6, the spindle motor controlling circuit 4 calculates the level of the controlling voltage to be applied to the spindle motor 3 to set the rotation velocity of the optical disc 2 to a rotation velocity indicated by the controlling signal. The spindle motor 3 is applied with th controlling voltage from the spindle motor controlling circuit 4 and, thereby, is rotated. Description will be given for a signal produced by each circuit referring to FIG. 4. Based on the counter electromotive force generated when the spindle motor 3 rotates, the FG generating circuit 5 produces 18 pulses of FG signal per one round of the spindle motor 3 (per one round of the optical disc 2). The frequency dividing circuit 9 produces an SFG signal by providing the frequency of the FG signal into pieces of $1/18$ thereof, and outputs the SFG signal to the phase comparing circuit 55 and the supervising controlling unit 6. The oscillating circuit 63 produces CLK and outputs the CLK to the frequency dividing circuit 64, the encoder 8, the supervising controlling unit 6, and the counter 34. The frequency dividing circuit 64 outputs to the phase comparing circuit 65 a signal obtained by dividing the frequency of CLK into pieces of $1/n$ thereof. The phase comparing circuit 65 outputs to the spindle motor controlling circuit 4 the comparison result obtained by comparing the phase of the rise of the SFG signal with the phase of the rise of the signal from the frequency dividing circuit 64. Based on the comparison result from the phase comparing circuit 65, the spindle motor controlling circuit 4 adjusts the level of the controlling voltage to be applied to the spindle motor 3. As a result, as shown in FIG. 4, the FG signal, the SFG signal, CLK, and the signal from the frequency dividing circuit 64 are synchronized with each other in phase relative to the reference position.

Based on that the rotation scheme of the optical disc 2 has been determined as CAV scheme, the supervising controlling unit 6 transmits a controlling signal to the laser power controlling circuit 32 to increase the light intensity of the laser light beam as the optical pickup device 11 moves from the inner circumference side to the outer circumference side of the optical disc 2.

The supervising controlling unit 6 transmits a controlling signal to the thread processing circuit 28 to apply the laser light beam to, for example, each dot in the first row of the image region, to set the reference level Ref of the peak hold circuit 41 and the bottom hold circuit 42. Based on the controlling signal from the supervising controlling unit 6, the thread processing circuit 28 applies to the stepping motor 29 a controlling voltage to set the distance of move of the optical pickup device 11 to the distance of move facing the first row of the image region. The stepping motor 29 rotate for the stepping distance corresponding to the level of the controlling voltage. As a result, the laser light beam is applied to the first row of the optical disc 2. After a reflected light beam of the laser light beam has been through the above procedure, the supervising controlling unit 6 transmits the reference level signal so as to set the minimal value of the level of the RF signal produced by the RF signal processing circuit 21 to a reference level. As a result, the reference level Ref of the peak hold circuit 41 and the bottom hold circuit 42 is set. The supervising controlling unit 6 transmits a controlling signal to set the gain of the variable amplifying circuit 40. As a result, the gain of the variable amplifying circuit 40 is set.

The following description will describe operation of the image information detecting apparatus 1 taken when the image information detecting apparatus 1 detects the image information indicating the image formed on each dot in the Xth row in the first column (the reference position), the Xth row in the Y1th column, and the Xth row in the Y2th column as above. However, the detection of the image information from each dot may be operation executed such that the image information is detected sequentially from the inner circumference side (the first row) to the outer circumference side, consequently reaching the Xth row. For example, the detection may be operation executed when the Xth row is reached without detecting any image information from other rows based on the instructing signal from the host computer 25. The detection may be operation executed when, in the Xth row, the first column, the Y1th column, and the second column are reached to detect the image information from the first column to the nth column sequentially. For example, the detection may be operation executed when the first column, the Y1th column, and the Y2th column are reached without detecting any image information from other columns based on the instructing signal from the host computer 25.

The supervising controlling unit 6 transmits a controlling signal to the thread processing circuit 28 to apply the laser light beam to each dot in the Xth row in the image region. The thread processing circuit 28 applies to the stepping motor 29 a controlling voltage to set the distance of move of the optical pickup device 11 to the distance of move facing the Xth row of the image region based on the controlling signal from the supervising controlling unit 6. The stepping motor 29 rotates for a stepping distance corresponding to the level of the controlling voltage. The supervising controlling unit 6 reads resonance frequency. information representing a resonance frequency specific to the actuator 15 from, for example, the memory 27. The supervising controlling unit 6 calculates a frequency of an AC signal generated by the vibration adding circuit 18 based on the resonance frequency information from the memory 27 and the actual rotation frequency of the optical disc 2 calculated based on the FG signal. More specifically, the supervising controlling unit 6 produces a controlling signal to set the frequency of the AC signal to the resonance frequency indicated by the resonance frequency information and a frequency other than a frequency that is an integral multiple equal to or larger than one of the actual rotation frequency. The supervising controlling unit 6 calculates the amplitude of the AC signal to be same as the minimal distance of move of the optical pickup device 11 according to the thread control of the thread controlling circuit 28, and transmits a controlling signal. As a result, the laser light beam is applied vibrating at the vibration frequency indicated by the controlling signal to the Xth row of the optical disc 2.

The counter 34 counts the rise of CLK from the oscillation circuit 63. When the supervising controlling unit 6 determines the count value of the counter 34 as one (the first row) that is, when the laser light beam is applied to the color changing layer 102 (the first row in the first column) after the image has been formed therein), the supervising controlling unit 6 transmits a timing signal to the peak hold circuit 41 and the bottom hold circuit 42. The variable amplifying circuit 40 amplified with the gain being set the RF signal from the RF signal processing circuit 21 obtained as the result being through the above procedure of the reflected light beam of the laser light beam that has been applied to the dot in the Xth row in the first column and outputs the amplified RF signal to the peak hold circuit 41 and the bottom hold circuit 42. Based on the timing signal, the peak hold circuit 41 holds the peak level of the RF signal amplified relative to the reference level Ref in a Term T1 (see FIG. 6A) until the time when the next timing signal from the supervising controlling unit 6 is received. Based on he timing signal, the bottom hold circuit 42 holds the bottom level of the amplified RF signal relative to the reference level Ref in the term T1. As shown in FIG. 5, a darker image is formed on the dot in the Xth row in the first column compared with that on the dot in the Y1th column and the Y2th column. Therefore, the reflectance against the laser light beam becomes highest. Therefore, the peak level and the bottom level obtained when the laser light beam is applied to the dots in the Xth row and the first column are higher than the peak level and the bottom level obtained when the laser light beam is applied to the dots in the Yth column and the Y2th column (see FIGS. 6A, 6B, and 6C). The supervising controlling unit 6 calculates application position (the Xth row in the first column) information of the laser light beam in the image region, based on information indicating the amount of move to the Xth row of the optical pickup device 11 according to the thread control of the thread processing circuit 28 and on the count value of the counter 34.

The counter 34 counts the next rise of CLK from the oscillating circuit 63. When the supervising controlling unit 6 determines that the count value of the counter 34 is two (the second column), the unit 6 transmits a timing signal to the peak hold circuit 41 and the bottom hold circuit 42. The peak hold circuit 41 outputs to the adding circuit 43 the signal Vpt-Ref indicating the peak level relative to the reference level Ref in the term T1. The bottom hold circuit 42 outputs to the adding circuit 43 the signal Vbt-Ref indicating the bottom level relative to the reference level Ref in the term T1. The signal Vpt-Ref from the peak hold circuit 41 and the signal Vbt-Ref from the bottom hold circuit 42 are added by the adding circuit 43 and the addition result (Vpt-Ref)+(Vbt-Ref) is outputted to the AD converter 44. The AD converter 44 outputs to the supervising controlling unit 6 one logic value "1" formed by converting the addition result (Vpt-Ref)+(Vbt-Ref) into a one-bit digital signal. Based on the one logic value "1", the supervising controlling unit 6 determines that an image has been formed in the color changing layer 102, adds, for example, the application position information to the judgment result, and transmits the result to the buffer memory 23. Though the supervising control unit 6 adds the application position information to the judgment result in the embodiment, the information to be added as above is not limited to this. For example, when the image information detecting apparatus 1 detects the image information sequentially from the inner circumference side (the first row) to the outer circumferential side (the mth row) to the color changing layer 102, order of the detected image information represents the position information. Therefore, it can be determined of which position the detected image information indicates the image formed at a dot, without adding the application position information. Therefore, in this case, the application position information does not need to be added to the judgment result. Though the supervising controlling unit 6 determines whether an image has been formed to the color changing layer 44 based on the logic value from the AD converter 44 in the embodiment, the judgment is not limited to this. When the digital signal of a plurality of bits indicating the contrast of the above image from the AD converter 44 is received, the digital signal of the plurality of bits may be provided to be transmitted to the buffer memory 23.

Similarly, when the supervising controlling unit 6 determines that the count value of the counter 34 is Y1 (the Y1th column) (that is, when the laser light beam is applied to the color changing layer 102 in the first row in the Y1th column after an image has been formed therein), the unit 6 transmits a timing signal to the peak hold circuit 41 and the bottom hold circuit 42. The variable amplifying circuit 40 amplifies with the gain being set the RF signal from the RF signal processing circuit 21 obtained as the result of being through the above procedure of the reflected light beam of the laser light beam that has been applied to the dot in the Xth row in the Y1th column and outputs the amplified RF signal to the peak hold circuit 41 and the bottom hold circuit 42. Based on the timing signal, the peak hold circuit 41 holds the peak level of the RF signal amplified relative to the reference level Ref in a term T2 (see FIG. 6B) until the time when the next timing signal from the supervising controlling unit 6 is received. Based on the timing signal, the bottom hold circuit 42 holds the bottom level of the amplified RF signal relative to the reference level Ref in the term T2. As shown in FIG. 5, the dot in the Xth row in the Y1th column has an image formed therein, the image being lighter than that in the dots in the first column and being darker than that in the dots in the Y2th column. Therefore, the reflectance of the dot in the Xth row in the Y1th column against the laser light beam is lower than that of the dots in the first column and is higher than that of the dots in the Y2th column. Therefore, the peak level and the bottom level obtained when the laser light beam is applied to the dots in the Xth row and the Y1th column are lower than the peak level and the bottom level obtained when the laser light beam is applied to the dots in the first column and higher than the peak level and the bottom level obtained when the laser light beam is applied to the dots in the Y2th column (see FIGS. 6A, 6B, and 6C). The supervising controlling unit 6 calculates application position (the Xth row in the Y1th column) information of the laser light beam in the image region, based on information indicating the amount of move to the Xth row of the optical pickup device 11 according to the thread control of the thread processing circuit 28 and on the count value of the counter 34.

The counter 34 counts the rise of the next CLK from the oscillation circuit 63. When the supervising controlling unit 6 determines the count value of the counter 34 as Y1+1 (the Y1+1th column), the supervising controlling unit 6 transmits a timing signal to the past hold circuit 41 and the bottom hold circuit 42. The peak hold circuit 41 outputs to the adding circuit 43 the signal Vpt-Ref indicating the peak level relative to the reference level Ref in the term T2. The bottom hold circuit 42 outputs to the adding circuit 43 the signal Vbt-Ref indicating the bottom level relative to the reference level Ref in the term T2. The signal Vpt-Ref from the peak hold circuit 41 and the signal Vbt-Ref form the bottom hold circuit 42 are added by the adding circuit 43 and the addition result (Vpt-Ref)+(Vbt-Ref) is outputted to the AD converter 44. The AD converter 44 outputs to the supervising controlling unit 6 one logic value "1" formed by converting the addition result (Vpt-Ref)+(Vbt-Ref) into a one-bit digital signal. Based on the one logic value "1", the supervising controlling unit 6 determines that an image has been formed in the color changing layer 102, adds, for example, the application position information to the judgment result, and transmits the result to the buffer memory 23. As described above, the application position information may not be added to the image information and a digital signal of a plurality of bits may be transmitted to the buffer memory 23. The contrast of an image indicated by the digital signal of the plurality of bits obtained when the laser light beam is applied to the dot in the Xth row in the Y1th column is lighter than the contrast of an image indicated by the above digital signal of the plurality of bits obtained when the laser light beam is applied in the dot in the Xth row in the first column.

Similarly, when the supervising controlling unit 6 determines that the count value of the counter 34 tis Y2 (the Y2th column) (that is, when the laser light beam is applied to the color changing layer 102 (the first row in the Y2th column) with no image formed therein), the unit 6 transmits a timing signal to the peak hold circuit 41 and the bottom hold circuit 42. The variable amplifying circuit 40 amplifies with the gain being set the RF signal from the RF signal processing circuit 21 obtained as the result of being through the above procedure of the reflected light beam of the laser light beam that has been applied to the dot in the Xth row in the Y2th column and outputs the amplified RF signal to the peak hold circuit 41 and the bottom hold circuit 42. Based on the timing signal, the peak hold circuit 41 holds the peak level of the RF signal amplified relative to the reference level Ref in a term T3 (see FIG. 6C) until the time when the next timing signal from the supervising controlling unit 6 is received. Based on the timing signal, the bottom hold circuit 42 holds the bottom level of the amplified RF signal relative to the reference level Ref in the term T3. As shown in FIG. 5, no image is formed on the dot in the Xth row in the Y2 column and, therefore, the dot is lighter compared to the dots in the first column and the Y1th column and the reflectance thereof against the laser light beam is lower than that of the dots in the first column and the Y1th column. Therefore, the peak level and the bottom level obtained when the laser light beam is applied to the dots in the Xth row in the Y2th column are lower than the peak level and the bottom level obtained when the laser light beam is applied to the dots in the first column and the Y1th column (see FIGS. 6A, 6B, and 6C). The supervising controlling unit 6 calculates application position (the Xth row in the Y2th column) information of the laser light beam in the image region, based on information indicating the amount of move to the Xth row of the optical pickup device 11 according to the thread control of the thread processing circuit 28 and on the count value of the counter 34.

The counter 34 counts the rise of the next CLK from the oscillation circuit 63. When the supervising controlling unit 6 determines the count value of the counter 34 as Y2+1 (the Y2+1th column), the supervising controlling unit 6 transmits a timing signal to the past hold circuit 41 and the bottom hold circuit 42. The peak hold circuit 41 outputs to the adding circuit 43 the signal Vpt-Ref indicating the peak level relative to the reference level Ref in a term T3. The bottom hold circuit 42 outputs to the adding circuit 43 the signal Vpt-Ref indicating the bottom level relative to the reference level Ref in the term T3. The signal Vpt-Ref from the peak hold circuit 41 and the signal Vbt-Ref from the bottom hold circuit 42 are added by the adding circuit 43 and the addition result (Vpt-Ref)+(Vpt-Ref) is outputted to the AD converter 44. The AD converter 44 outputs to the supervising controlling unit 6 the other logic values "0" formed by converting the addition result (Vpt-Ref)+(Vbt-Ref) into a one-bit digital signal. Based on the other logic value "0", the supervising controlling unit 6 determines that an image has been formed in the color changing layer 102, adds, for example, the application position information to the judgment result, and transmits the result to the buffer memory 23. As described above, the application position information may not be added to the image information and a digital signal of a plurality of bits may be transmitted to the buffer memory 23. The contrast of an image indicated by the digital signal of the plurality of bits obtained when the laser light beam is applied to the dot in the Xth row in the Y2th column is lighter than the contrast of an image indicated by the above digital signal of the plurality of bits obtained when the laser light beam is applied to the dot in the Xth row in the first column, in the Y1th column.

As a result, the image information indicating an image formed on each dot in the Xth row in the first column (the reference position), the Y1th column, and the Y2th column is detected. For example, the host computer 25 reads the image information (the judgment result or the digital signal of the plurality of bits) from the buffer memory 23 and, thereby, the desired processing can be executed. An example can be the case where the image information is recorded in a recording medium (a CD, etc.) and the image information is read by the optical disc image forming apparatus (not shown) from the recording medium. The optical disc image forming apparatus executes the processing for image forming based on the image information and, thereby, an identical image can be formed in the color changing layer 102 of the optical disc 2. Otherwise, it is assumed that the image information detecting apparatus 1 receives some influence (for example, an impact or power source shutdown) while the apparatus 1 is forming an image in the color changing layer 102 and the image forming is stopped. In this case, the image information detecting apparatus 1 detects the image information indicating the image formed to the dot for which the image forming is stopped, compares the detected image information with the image forming data based on the data in the bitmap format from the host computer 25, and detects the image forming data to form the image on the dots after the dot for which the image forming is stopped. Based on the detected image forming data, the image information detecting apparatus 1 forms the image on the dots after the dot for which the image forming is stopped and, thereby, excellent image forming can be executed without being influenced by the stopping of the image forming.

Though the RF level detecting circuit 35 is configured by the peak hold circuit 41, the bottom hold circuit 42, and the adding circuit 43 to detect the image information from the color changing layer 102 according to the above, the configuration is not limited to this. The RF level detecting circuit 35 may be configured by only either one of the peak hold circuit 41 and the bottom hold circuit 42. For example, when the RF level detecting circuit 35 is configured only the peak hold circuit 41, the circuit 35 detects the image information from the signal Vpt-Ref indicating the peak level relative to the reference level Ref. The slice level of the AD converter 44 in this case is set to, for example, an intermediate level between the signal Vpt-Ref obtained when the laser light beam is applied to the color changing layer 102 after an image has been formed therein and the signal Vpt-Ref obtained when the laser light beam is applied to the color changing layer 102 with no image formed therein. By configuring the RF level detecting circuit 35 by either one of the peak hold circuit 41 and the bottom hold circuit 42, cost of the RF level detecting circuit 35 can be reduced and complication of circuit wiring, etc., of the circuit 35 can be prevented.

According to the above, description has been given assuming that the color changing layer 102 of the optical disc 2 has a characteristic that the reflectance thereof against the laser light beam is increased as the laser light beam is applied more. However, the characteristic is not limited to this. For example, it is assumed that the color changing layer 102 of the optical disc 2 has a characteristic that the reflectance thereof is decreased as the laser light beam is applied more. In this case, the supervising controlling unit 6 may be provided such that the unit 6 produces the reference level signal such that the reference level Ref of the peak hold circuit 41 and the bottom hold circuit 42 is, for example, the maximal value of the level of the RF signal obtained when the laser light beam is applied to the image region. As a result, the image information detecting apparatus 1 of the present invention can also be applied to the color changing layer 102 having the reflectance thereof that decreases as the laser light beam is applied more and detection of the image information from the color changing layer 102 can also be executed successfully.

Though the supervising controller unit 6 determines which column the laser light beam is applied to dots in based on the count value of the counter 34 according to the above, the judgment method is not limited to this. For example, time when the laser light beam is applied to the dot in each column from the reference position may have been obtained in advance in an experiment, etc., and may be stored in the memory 27 as table data. The supervising controlling unit 6 may cause a timer not shown to measure the time at the timing of the rise of the SFG signal and may determine which column the laser light beam is applied to the dots in based on the measured time of the timer and the table data in the memory 27.

Though the present invention employs the CAV scheme to make the angular velocity of the optical disc 2 constant according to the above, the scheme is not limited to this. For example, a CLV (Constant Linear Velocity) scheme that makes the linear velocity of the optical disc 2 constant and a ZCLV (Zones CLV) that makes the linear velocity of the optical disc 2 constant for every plurality of zoned regions may be employed. In this case, the supervising controlling unit 6 controls the spindle motor controlling circuit 4 such that the rotation frequency of the optical disc 2 on the outer circumference side is lower than the rotation frequency of the optical disc 2 on the inner circumference side corresponding to the amount of move of the optical pickup device 11 according to the thread control of the thread controlling circuit 28. As a result, by making the linear velocity of the optical disc 2 constant, the laser power control of the laser power controlling circuit 32 from the inner circumference side to the outer circumference side is not necessary and, therefore, load on the controlling process can be reduced.

According to the above embodiment, the image information indicating an image from the color changing layer 102 after the image has been formed therein can be detected. As a result, for example, the detected image information can be stored in a recording medium, etc., (not shown) and, therefore, formation of an identical image in the optical disc 2 having another color changing layer 102 and formation of an identical image in another image information detecting apparatus 1 can be executed. Otherwise, when the formation of an image in the color changing layer 102 is stopped during thereof, the image can be formed again from the dot at which the formation is stopped by comparing the image information indicating the image already formed with the image forming data from the host computer 25.

By configuring the image information detecting apparatus 1 using at least one of the peak hold circuit 41 and the bottom hold circuit 42, the image information indicating the image can be detached from the color changing layer 102 after the image has been formed therein. For example, when only either one of the peak hold circuit 41 and the bottom hold circuit 42 is used in the configuration, cost on the image information detecting apparatus 1 can be reduced and complication of the circuit wiring, etc., can be prevented. Otherwise, by using the peak hold circuit 41 and the bottom hold circuit 42 in the configuration, in the case where, for example, a noise component, etc., are generated at the bottom level, influence by the noise component, etc., to the image information can be reduced by adding the peak level and the bottom level. That is, the SN ratio of the image information detected by the image information detecting apparatus 1 can be improved.

Based on the digital signal from the AD converter 44 corresponding to the addition result of the peak level and the bottom level or the comparison result of the either one of the levels with the slice level, the image information indicating the image can be detected from the color changing layer 102 after the image has been formed therein. As a result, a digital process (judgment of presence or absence of image formation to the color changing layer 102, etc.) can be executed in a circuit in the latter stage of the AD converter 44 (for example, the supervising controlling unit 6).

By configuring using the AD converter 44 that outputs the one-bit digital signal, whether the image is formed in the color changing layer 102 can be determined based on one logic value "1" and whether the image is not formed in the color changing layer 102 can be determined based on the other logic value "0". Reduction of cost of the AD converter 44 and simplification of the circuit scale can be facilitated.

By configuring using the AD converter 44 that outputs the digital signal of the plurality of bits, the digital signal of the plurality of bits indicating the contract of the image can be obtained from the color changing layer 102 after the image has been formed therein. For example, an image having the same contrast can be formed to the optical disc 2 having another color changing layer 102. For example, when the image is formed only on the dots on the inner circumference side of the optical disc 2, the image can be formed on the dots with no image formed thereon after th dot. More specifically, when the AD converter has the resolution thereof, for example, three bits, the digital signal of the plurality of bits detected from the dots with no image formed thereon represents "000" that indicates the lightest state. The "000" is sequentially detected for a predetermined number of times (for example, "000" on all the dots in several rows) and those "000" are held in the buffer memory 23. In this case, the image information detecting apparatus 1 is in, for example, the image information detecting mode as the initial operation of the image forming mode that follows, detects the dot at the head of consecutive "000"s, and, hereafter, executes from the dot at the head image forming based on the image forming data. As a result, the image can be formed even to the dots to which the image is not formed based on the digital signal of the plurality of bits from the dots to which the image is not formed.

Based on the timing signal from the supervising controlling unit 6 obtained when the laser light beam is applied to a dot through a dot adjacent to the dot in the rotation direction of the optical disc 2, at least one of the peak level and the bottom level is held and, thereby, the image information corresponding to each dot can be detected from the color changing layer 102 after the image is formed therein. As a result, more accurate image information indicating the image formed in the color changing layer 102 can be detected.

The rotation of the optical disc 2 and the holding operation of at least one of the peak level and the bottom level can be synchronized with each other. As a result, more accurate image information corresponding to each dot can be detected from the color changing layer 102 after the image has been formed therein.

The phase of the signal outputted by the frequency dividing circuit 64 based on CLK from the oscillating circuit 63 and the phase of the SFG signal outputted by the frequency dividing circuit 9 based n the FG signal from the FG generating circuit 5 are synchronized and, thereby, the image information corresponding to each dot can be detected more securely from the color changing layer 102 after the image has been formed therein.

Though the embodiment of the present invention has been described, the above embodiment is to facilitate the understanding of the present invention and is not to limitedly construe the present invention. The present invention can be changed/improved without departing the spirit thereof and includes the equivalents thereof.

What is claimed is:

1. An image information detecting apparatus comprising:
a semiconductor laser that emits a laser light beam;
a light receiving unit that receives a reflected light beam of the laser light beam applied to a color changing layer of an optical disc, the color changing layer being formed from a photo-sensitive material or a heat-sensitive material, and that outputs an electric signal corresponding to the level of the reflected light beam; and
a detecting unit that detects image information based on the electric signal, wherein the detecting unit comprises:
a holding unit that holds at least one level of a peak level and a bottom level of the electric signal that varies depending on the level of the reflected light beam; and
a determining unit that determines whether presence or absence of the image information, or determines a contrast of the image information, depending on the result of comparison of the level held by the holding unit with a reference level,
wherein the image information detecting apparatus detects the image information indicating an image from the color changing layer after the image has been formed therein.

2. The image information detecting apparatus of claim 1, wherein the determining unit has an AD converter that outputs a digital signal of predetermined bits, depending on the result of the comparison of the level held by the holding unit with the reference level, and
wherein the determining unit determines whether presence or absence of the image information, or determines a contrast of the image information, depending on a value of the digital signal.

3. The image information detecting apparatus of claim 2, wherein the digital signal is a one-bit signal that is at one logic value indicating the presence of the image information or is at the other logic value indicating the absence of the image information, depending on the result of the comparison of the level held by holding unit with the reference level.

4. The image information detecting apparatus of claim 2, wherein the digital signal is a signal of a plurality of bits that is at a combination of logic values indicating a contrast of the image.

5. The image information detecting apparatus of claim 1, wherein the holding unit holds at least one level of the peak level and the bottom level in divided areas of the color changing layer, the divided areas being defined by the minimal distance moved by the optical disc in the rotation direction thereof and being defined by the minimal distance moved by the semiconductor laser in the radial direction of the optical disc.

6. The image information detecting apparatus of claim 5, further comprising a synchronization controlling circuit that synchronizes the rotation of the optical disc with the holding operation of the holding unit.

7. The image information detecting apparatus of claim 6, wherein the synchronization controlling circuit comprises:
a clock generating circuit that generates a clock at a predetermined frequency that is a trigger for the holding unit to hold at least one level of the peak level and the bottom level of the electric signal;
a rotation signal generating circuit that generates a rotation signal indicating a rotation frequency of the optical disc; and
a phase comparing circuit that synchronizes the phase of the clock with the phase of the rotation signal.

* * * * *